US012476038B2

(12) United States Patent
Foley

(10) Patent No.: US 12,476,038 B2
(45) **Date of Patent: *Nov. 18, 2025**

(54) NESTED FLAT WOUND COILS FORMING WINDINGS FOR TRANSFORMERS AND INDUCTORS

(71) Applicant: VISHAY DALE ELECTRONICS, LLC, Columbus, NE (US)

(72) Inventor: Matthew J. Foley, Berwick, ME (US)

(73) Assignee: Vishay Dale Electronics, LLC, Columbus, NE (US)

( * ) Notice: Subject to any disclaimer, the term of this patent is extended or adjusted under 35 U.S.C. 154(b) by 659 days.

This patent is subject to a terminal disclaimer.

(21) Appl. No.: 17/306,476

(22) Filed: May 3, 2021

(65) Prior Publication Data

US 2021/0358680 A1 Nov. 18, 2021

Related U.S. Application Data

(63) Continuation of application No. 15/148,736, filed on May 6, 2016, now Pat. No. 10,998,124.

(51) Int. Cl.

| | |
|---|---|
| ***H01F 27/28*** | (2006.01) |
| ***H01F 27/30*** | (2006.01) |
| ***H01F 41/061*** | (2016.01) |
| ***H01F 41/076*** | (2016.01) |
| ***H01F 41/098*** | (2016.01) |

(52) U.S. Cl.

CPC ..... *H01F 27/2828* (2013.01); *H01F 27/2852* (2013.01); *H01F 27/2871* (2013.01); *H01F 27/30* (2013.01); *H01F 41/061* (2016.01); *H01F 41/076* (2016.01); *H01F 41/098* (2016.01)

(58) Field of Classification Search

CPC ............. H01F 27/2828; H01F 27/2852; H01F 27/2871

USPC .......................................................... 336/170

See application file for complete search history.

(56) References Cited

U.S. PATENT DOCUMENTS

| | | | | |
|---|---|---|---|---|
| 5,175,525 | A * | 12/1992 | Smith | H01F 27/2866 336/83 |
| 8,350,659 | B2 * | 1/2013 | Dziubek | H01F 27/303 336/205 |
| 9,318,251 | B2 * | 4/2016 | Klesyk | H01F 27/32 |
| 9,378,885 | B2 * | 6/2016 | Hongzhong | H01F 27/2871 |
| 9,484,144 | B2 * | 11/2016 | Su | H01F 27/2828 |
| 10,998,124 | B2 * | 5/2021 | Foley | H01F 27/2852 |
| 11,177,066 | B2 | 11/2021 | Hatol et al. | |
| 11,380,473 | B2 | 7/2022 | Ebner et al. | |

(Continued)

FOREIGN PATENT DOCUMENTS

| | | |
|---|---|---|
| CN | 1979704 A * | 6/2007 |
| CN | 1979704 B | 6/2010 |

(Continued)

*Primary Examiner* — Shawki S Ismail
*Assistant Examiner* — Joselito S. Baisa
(74) *Attorney, Agent, or Firm* — Volpe Koenig

(57) ABSTRACT

An electro-magnetic device is provided, including a first winding set of nested windings, and a second winding set of nested windings positioned adjacent to the first winding set. A method of making an electro-magnetic device including a first winding set of nested windings, and a second winding set of nested windings positioned adjacent to the first winding set is also provided.

24 Claims, 17 Drawing Sheets

(56) References Cited

U.S. PATENT DOCUMENTS

| | | | | |
|---|---|---|---|---|
| 2012/0176214 | A1* | 7/2012 | Hsiao | H01F 27/2823 336/183 |
| 2014/0210584 | A1* | 7/2014 | Blow | H01F 27/255 336/173 |
| 2018/0137967 | A1* | 5/2018 | Honna | H01F 27/2828 |
| 2019/0180922 | A1* | 6/2019 | Hatol | H01F 27/2847 |
| 2021/0012943 | A1* | 1/2021 | Ebner | H01F 27/29 |
| 2022/0328242 | A1* | 10/2022 | Ishii | H01F 27/292 |

FOREIGN PATENT DOCUMENTS

| | | | | | |
|---|---|---|---|---|---|
| EP | 0939412 | A2 | * | 9/1999 | H01F 27/292 |
| JP | H0444118 | U | | 4/1992 | |
| JP | H07245217 | A | * | 9/1995 | |
| JP | H08264338 | A | | 10/1996 | |
| JP | 2001332430 | A | * | 11/2001 | H01F 27/325 |
| JP | 2004095999 | A | | 3/2004 | |
| JP | 4800451 | B1 | | 10/2011 | |
| JP | 2012235033 | A | * | 11/2012 | H01F 27/2823 |
| JP | 5172767 | B2 | | 3/2013 | |
| JP | 5381610 | B2 | | 1/2014 | |
| JP | 2015188033 | A | | 10/2015 | |
| JP | 2015192082 | A | | 11/2015 | |
| JP | 5842282 | B2 | | 1/2016 | |
| JP | 2016054197 | A | | 4/2016 | |
| JP | 7578534 | B2 | | 11/2024 | |
| TW | I462129 | B | | 11/2014 | |

* cited by examiner

NESTED FLAT WOUND COILS FORMING WINDINGS FOR TRANSFORMERS AND INDUCTORS

CROSS REFERENCE TO RELATED APPLICATION(S)

This application is a continuation of U.S. patent application Ser. No. 15/148,736, filed May 6, 2016, the entire contents of which are hereby incorporated by reference as if fully set forth herein

FIELD OF INVENTION

This present invention relates to the field of electronic components, and more specifically, nested flat wound coils forming windings for magnetic devices such as transformers and inductors.

BACKGROUND

Generally, a transformer is an electrical device that transfers electrical energy between two or more circuits through electromagnetic induction. Electromagnetic induction produces an electromotive force (EMF) across a conductor which is exposed to time varying magnetic fields. That is, a varying current in the transformer's primary winding creates a varying magnetic flux in the transformer core and a varying magnetic field impinging on the transformer's secondary winding. This varying magnetic field at the secondary winding induces a varying EMF or voltage in the secondary winding due to electromagnetic induction. Transformers rely on Faraday's Law and high magnetic permeability core properties, to efficiently change AC voltages from one voltage level to another, such as within power networks, for example.

Presently available planar devices, such as transformers, utilize printed circuit boards for windings. The fill factor of these printed circuit board based products is approximately 35%. These known products allow minimal variation in winding thickness within the same package, and do not allow for design flexibility without extensive cost.

Therefore, a need exists to produce transformers that have a greater conductor fill factor, allow variable thickness and numbers of wires to be utilized within the same package, have windings that build outward for a proximity effect, all while producing higher power transformers with reduced height.

In addition, there remains the need for devices that allow for varied arrangements of coils, such as in the number, types and positioning of coils, in reduced sized packages.

SUMMARY

Transformer or inductor devices including nested flat wound coils and methods for making those devices are disclosed.

An electro-magnetic device is provided including a first winding set of nested windings, and a second winding set of nested windings positioned adjacent to the first winding set. A method of making an electro-magnetic device including a first winding set of nested windings, and a second winding set of nested windings positioned adjacent to the first winding set is also provided.

The present invention allows for the use of flat or edge wound magnet wire to create windings for low profile magnetics. The construction and arrangement of the windings allows for inner and outer coil windings to be wound on different mandrels, and allows one or multiple coils to be positioned in a nested and stacked arrangement. This allows for the creation of higher turn windings. Devices according to the present invention can be stacked with rows of windings.

In an aspect of the invention, a first winding is provided comprising flat wire, with the first winding having an opening defining a first diameter. A second winding is provided comprising flat wire, the second winding having an opening defining a second diameter. The second winding is sized to be nested within the opening of the first winding. The first winding and the second winding form a first winding set having a lowermost flat surface and an uppermost flat surface. A third winding is provided comprising flat wire, the third winding having an opening defining a third diameter. A fourth winding is provided comprising flat wire, the fourth winding having an opening defining a fourth diameter. The fourth winding is sized to be nested within the opening of the third winding. The third winding and the fourth winding form a second winding set having a lowermost flat surface and an uppermost flat surface. In an embodiment, the first winding set is positioned above and adjacent to the second winding set, and the lowermost surface of the first winding set is adjacent to and facing the uppermost surface of the second winding set.

A method for manufacturing a transformer with nested flat wound coils includes winding a plurality of windings for use in the transformer on a mandrel with the desired inner and outer diameters, assembling a nested pair of the plurality of windings by placing an inner winding of the plurality of windings within an outer winding of the plurality of windings where the outer diameter of the inner winding complements the inner diameter of the outer winding, assembling the nested pair of windings on a support frame, and coupling a top coil terminal end and a bottom coil terminal end of each of the two windings within the nested pair of windings individually each to one of a plurality of connection points to provide a set of desired electrical connections. The method further includes assembling a bottom core and a top core about the assembled nested pair of the plurality of windings.

The method may further include forming a second set of nested windings by assembling a second nested pair of the plurality of windings by placing a second inner winding of the plurality of windings within a second outer winding of the plurality of windings where the outer diameter of the second inner winding complements the inner diameter of the second outer winding, assembling the second nested pair of windings on the support frame, and coupling a top coil terminal end and a bottom coil terminal end of each of the two windings within the second nested pair of windings individually each to one of a plurality of connection points to provide a set of desired electrical connections.

The outer diameter of the second inner winding may be different than the outer diameter of the inner winding. The inner diameter of the inner winding and the inner diameter of the second inner winding may be substantially the same. The outer diameter of the outer winding and the outer diameter of the second outer winding may be substantially the same.

The inner winding and the second inner winding may be wound on the same mandrel. The outer winding and the second outer winding may be wound on the same mandrel. The plurality of windings may be wound on different size mandrels.

In an aspect of the invention, flat or planar coil windings are used to create inner and outer windings for magnetic devices. These devices utilize magnet wire that has been wound on edge and/or has been spiral wound in various shapes to allow for the creation of multi-turn windings.

A magnetic device comprising nested flat wound coils forming inner and outer windings is provided. A support frame is provided including a central column and a plurality of pins. A plurality of nested windings surrounds the central column. Terminal ends of the plurality of nested windings may be connected to the pins.

The windings of the invention may or may not be formed from the wires having the same or different wire thickness, wire width or numbers of turns. The various windings may be formed of the same or different wire types, having similar or different characteristics.

The nested flat wound coils of the present invention may be used in a device such as a transformer or inductor.

BRIEF DESCRIPTION OF THE DRAWINGS

A more detailed understanding may be had from the following description, given by way of example in conjunction with the accompanying drawings wherein.

DETAILED DESCRIPTION OF THE PREFERRED EMBODIMENTS

Figure 1:
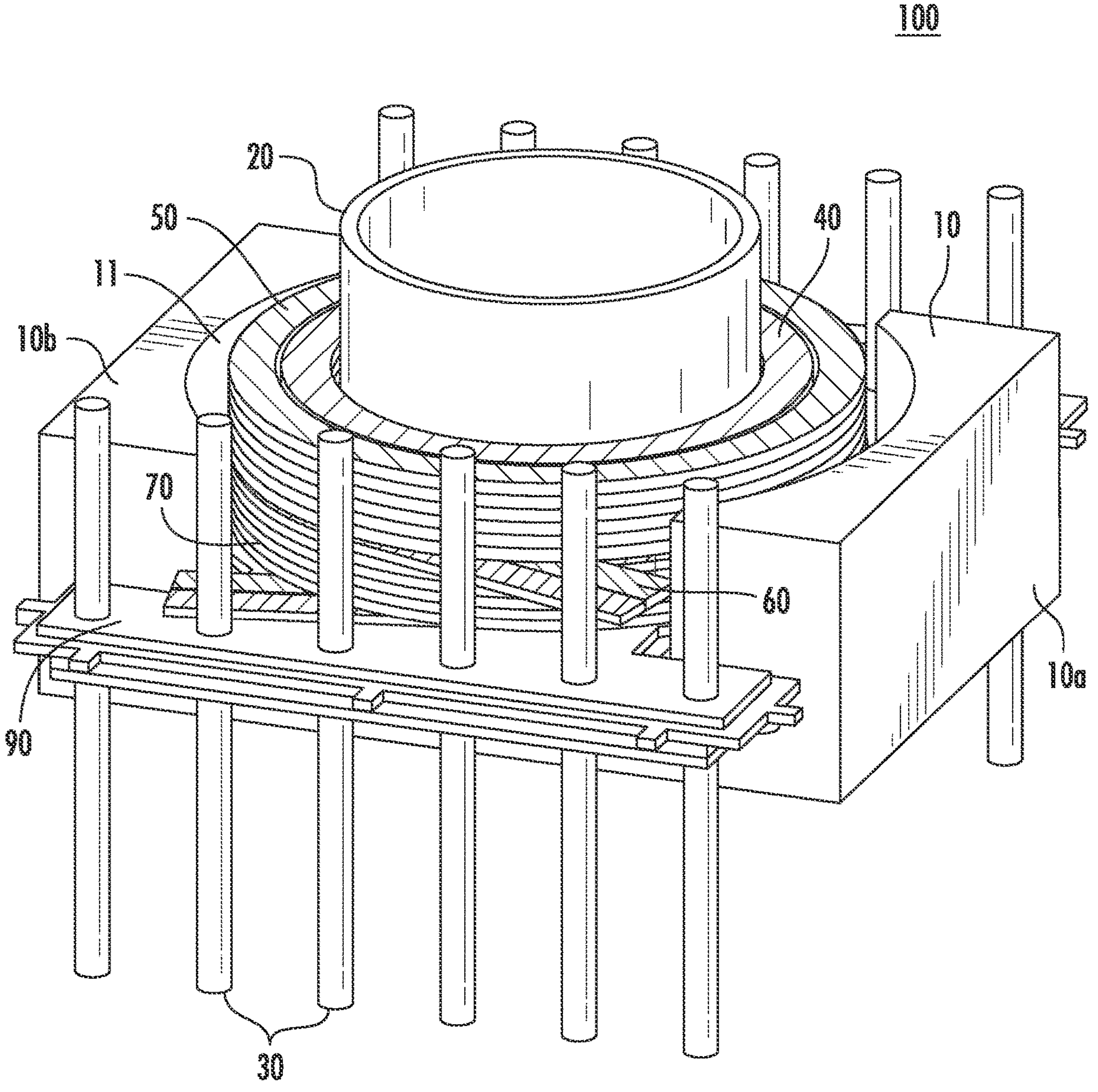
FIG. 1 shows an embodiment of a transformer according to the present invention, with the top core removed to view the interior, and positioned on a frame having pins.

The description provided herein is to enable those skilled in the art to make and use the described embodiments set forth. Various modifications, equivalents, variations, combinations, and alternatives, however, will remain readily apparent to those skilled in the art. Any and all such modifications, variations, equivalents, combinations, and alternatives are intended to fall within the spirit and scope of the present invention defined by claims.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof.

Figure 2:
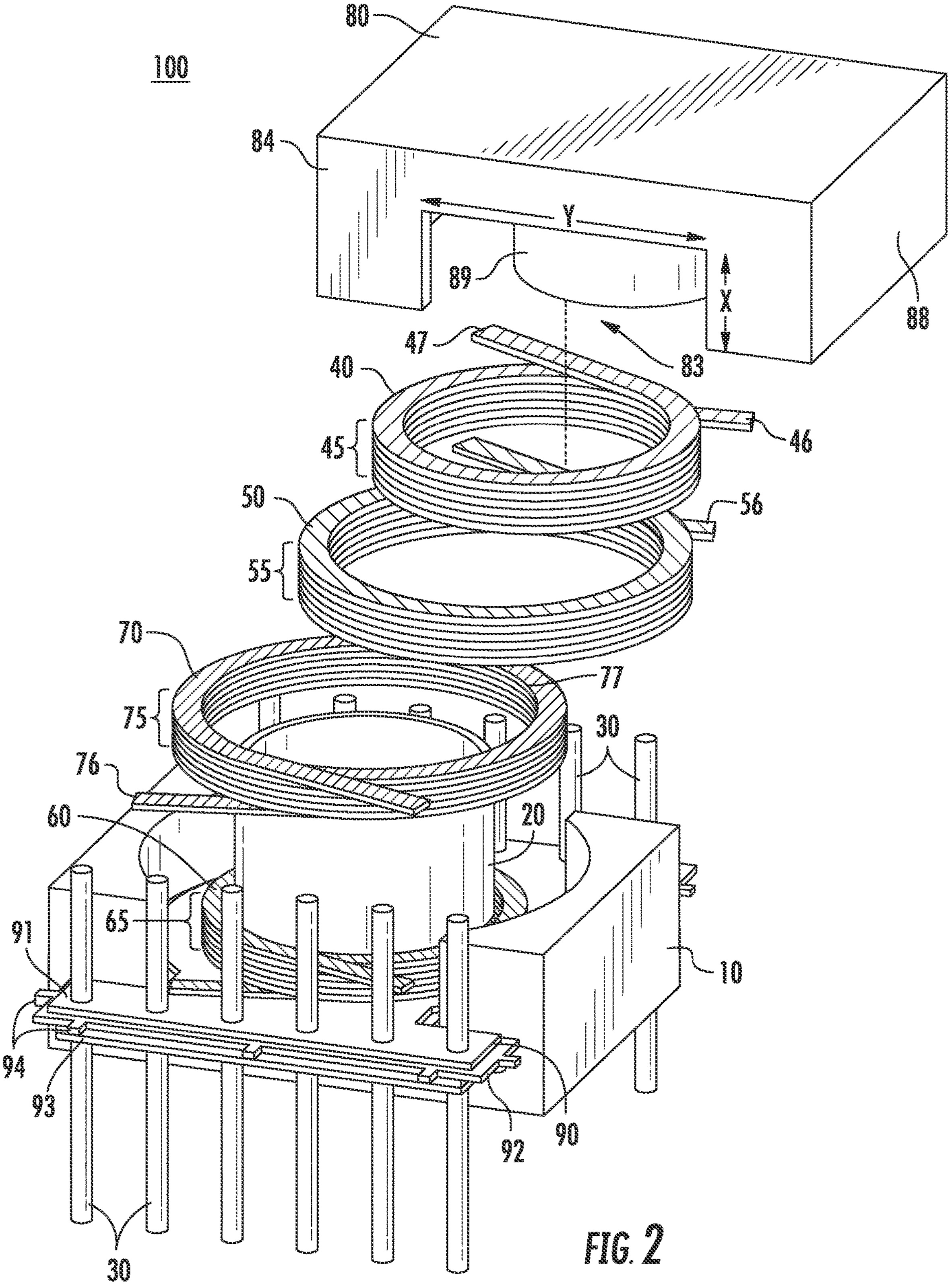
FIG. 2 shows an exploded view of the transformer of FIG. 1, including a top core.
Figure 3:
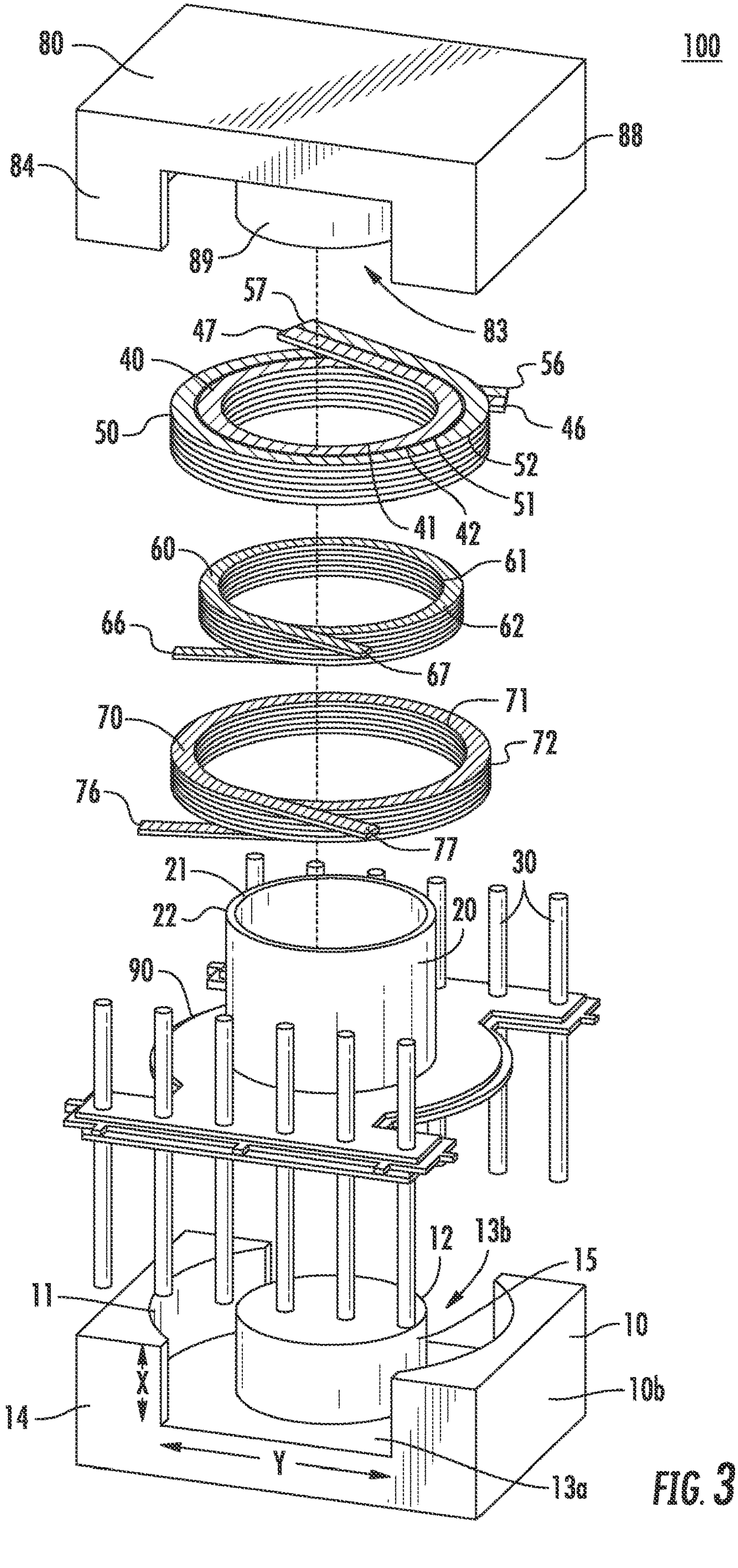
FIG. 3 shows an exploded view of the transformer of FIG. 2.

FIGS. 1-3 illustrate an example depiction of a transformer 100 utilizing the nested flat wound coils according to an embodiment of the present invention. As used herein, the terms coils and windings are used interchangeably. A transformer 100 includes a bottom core 10, which may include a first bottom core portion 10*a*, a second bottom core portion 10*b*, and a bottom core projection portion 15 (not shown in FIG. 1, in FIG. 3) extending upwardly from a surface of the bottom core 10, and a top core 80 (FIG. 2). The transformer 100 may further include a support frame 90 having a central column 20, and a plurality of connection pins 30 (FIGS. 2 and 3). It is noted that the support frame and/or any of its features may be optional, and no frame may be provided in certain embodiments and/or for certain applications. In an embodiment of the invention as shown in FIGS. 1-3, the nested flat wound coils are provided as a first inner winding 40, a first outer winding 50, a second inner winding 60, and a second outer winding 70.

Accordingly a first, top, or upper set of windings comprises the first inner winding 40 and the first outer winding 50. A second, bottom or lower set of windings comprises the second inner winding 60 and the second outer winding 70. Thus, the present invention can provided for multiple rows or stacks of winding sets.

The first bottom core portion 10*a* and the second bottom core portion 10*b* along with the top core portion 80 may encase the interior portions of the transformer 100 in a ferrite or powder material to contain and/or control and/or shield the electromotive forces within the transformer 100. The bottom core 10 may be formed as a single unitary piece, or may be formed from multiple pieces joined together. Thus, the first bottom core portion 10*a* and the second bottom core portion 10*b* may be formed from the same piece of material or may be separate pieces. In the case of a unitary bottom core 10, the bottom core 10 may be made from a single cast piece of ferrite material.

The bottom core 10 includes a bottom core projection portion 15, having a diameter, and preferably formed as a cylindrical projection extending upwardly from a central part of the bottom core 10. A curved channel or curved radius portion 11 is formed on sides of the bottom core projection portion 15, between the bottom core projection portion 15 and the first bottom core portion 10*a* and the second bottom core portion 10*b*. The curved channels 11 may have a generally semi-circular or a flat profile. The bottom core projection portion 15 may be made from the same materials as the bottom core 10. The bottom core projection 15 may be formed as a distinct element of the transformer 100 that is attached to the bottom core 10, or may be formed as a unitary part of the bottom core 10.

In an embodiment of the invention, a support frame 90 is provided including a plurality of connection pins 30 and a central column 20 extending through an opening in the support frame 90. The central column 20 is positioned at a mid-point of the support frame 90, with open ends above and below the support frame 90. The central column 20 preferably has a generally columnar or tubular shape, and may be formed as a spool or spindle. The central column 20 may be wholly or partially hollow. The central column 20 may be made from an insulating material such as an injection molded plastic, for example. The central column 20 may be formed as a tubular wall having an inner diameter measure across an inner circumference 21, and an outer diameter measured across an outer circumference 22. The central column 20 may be a part of or may be connected with or otherwise joined to the support frame 90.

As shown in FIGS. 1-3, the support frame 90 and the central column 20 are configured to be seated on and/or fit on the bottom core 10. The central column 20 is formed having an opening with a diameter greater than the diameter of the bottom core projection portion 15, and thus, the central column 20 is configured to coaxially surround the bottom core projection portion 15. The support frame 90 includes central curved portions that fit within the curved channels 11 formed between the bottom core projection portion 15 and the first bottom core portion 10*a* and the second bottom core portion 10*b*. Thus, the curved channels 11 are configured to have a shape complementary to the central curved portions of the support frame 90, and to receive the central curved portions of the support frame 90. As with the core, the curved channels 11 may have a generally semi-circular or a flat profile.

The pins 30 extend through opposite outer walls of the support frame 90, where the upper outer walls are generally rectangular. In the Figures, six pins 30 are shown on each side of the support frame 90.

In an embodiment of the invention, multiple stacked winding sets of nested windings are assembled in rows or stacks, and may be assembled about the central column 20 in rows. As shown in the Figures, flat, planar or edge-wound magnetic wires may preferably be used to form the windings according to the invention. The wires having a generally rectangular cross-section are shown. It is appreciated, however, that the wires configurations of varied cross-sections may be used, such as square, rectangular, oblong or round, as needed for a particular application.

Each of the coils is generally a flat, helically wound wire. In an embodiment of the invention as shown in FIGS. 1-3, a first, top or upper set, group or row of windings includes a first inner winding 40 and a first outer winding 50. The first inner winding 40 is positioned as a flattened coil, and may be positioned surrounding the central column 20 if one is provided in the arrangement. The first outer winding 50 has a central opening that coaxially receives and surrounds the first inner winding 40, such that the first inner winding 40 is nested within the central opening of the first outer winding 50.

A second, lower or bottom set, group or row of nested windings includes a second inner winding 60 and a second outer winding 70. The second inner winding 60 is positioned as a flattened coil, and may be positioned adjacent to and encircling a central column 20 if one is provided in the arrangement. The second outer winding 70 has a central opening that coaxially receives and surrounds the second inner winding 60, such that the second inner winding 60 is nested within the central opening of the second outer winding 70.

Each of the windings may be connected at the terminal ends of such winding to one of the plurality of connection pins 30, as will be described in greater detail.

It should be appreciated that varying the current on any one of the first inner winding 40, first outer winding 50, second inner winding 60, and/or second outer winding 70 may vary the magnetic field impinging on the other of the windings, i.e., first inner winding 40, first outer winding 50, second inner winding 60, and second outer winding 70 of transformer 100, inducing a varying EMF or voltage in the other of the windings, i.e., first inner winding 40 also referred to as a first inner coil, first outer winding 50 also referred to as a first outer coil, second inner winding 60 also referred to as a second inner coil, and second outer winding 70 also referred to as a first outer coil of transformer 100 due to electromagnetic induction.

As shown, the first inner winding 40 is nested within the first outer winding 50 and second inner winding 60 is nested within the second outer winding 70. The windings thus form winding sets as rows or groups in a stack of windings. The winding sets are stacked or positioned in rows, forming a winding column comprising a plurality of nested winding sets. The nested winding sets may be positioned around the central column 20. When stacked against each other, the flat, facing surfaces of the first and second winding sets contact respective adjacently positioned windings. That is, the uppermost surfaces of the wires of a lower winding set will face and be adjacent to, and can be in direct contact with, the lowermost surfaces of the wires of the next upper winding set.

The first inner winding 40 and the second inner coil 60 may preferably be aligned coaxially or along the vertical axis in a co-columnar configuration, and the first outer winding 50 and the second outer winding 70 may preferably be aligned. Based on the various sizes of the windings, and purpose of the applications for which a particular device is being used, other orientations may be utilized.

In a preferred embodiment, the nesting provides for a tight, close or snug fit between respective inner and outer windings. That is, the space between inner and outer windings is small, and may generally be preferably between 0.0005 inches and 0.100 inches. While the combination of an inner winding nested within an outer winding is illustrated, any number of windings may be nested and stacked.

For example, assuming an innermost winding, any given further outer winding will directly surround the next closest inner winding, with each further outer winding having a central opening sized with a diameter to accommodate and surround the one of more windings around which the given outer winding resides. As a further example, if three windings are nested in a winding set, an innermost winding will be provided, an intermediate winding will surround the innermost winding, and an outermost winding will surround the innermost winding, and the intermediate winding. If a central column 20 is provided, all of the windings will have openings sized to also around the central column 20. Thus, multiple variations of concentric or coaxial windings may be arranged according to the present invention. Additionally, multiple stacks, levels or rows of windings can be used.

The windings of the invention may be similarly formed or varied to meet design requirements and/or operation characteristics. The construction of the windings allows for inner windings and outer windings to be wound on different mandrels, and allows one or multiple windings to be nested either inside or outside of each other. The nested flat windings allow for a low profile. Other types of wires may also be used for windings having characteristics allowing for a low profile as well.

Figure 14:
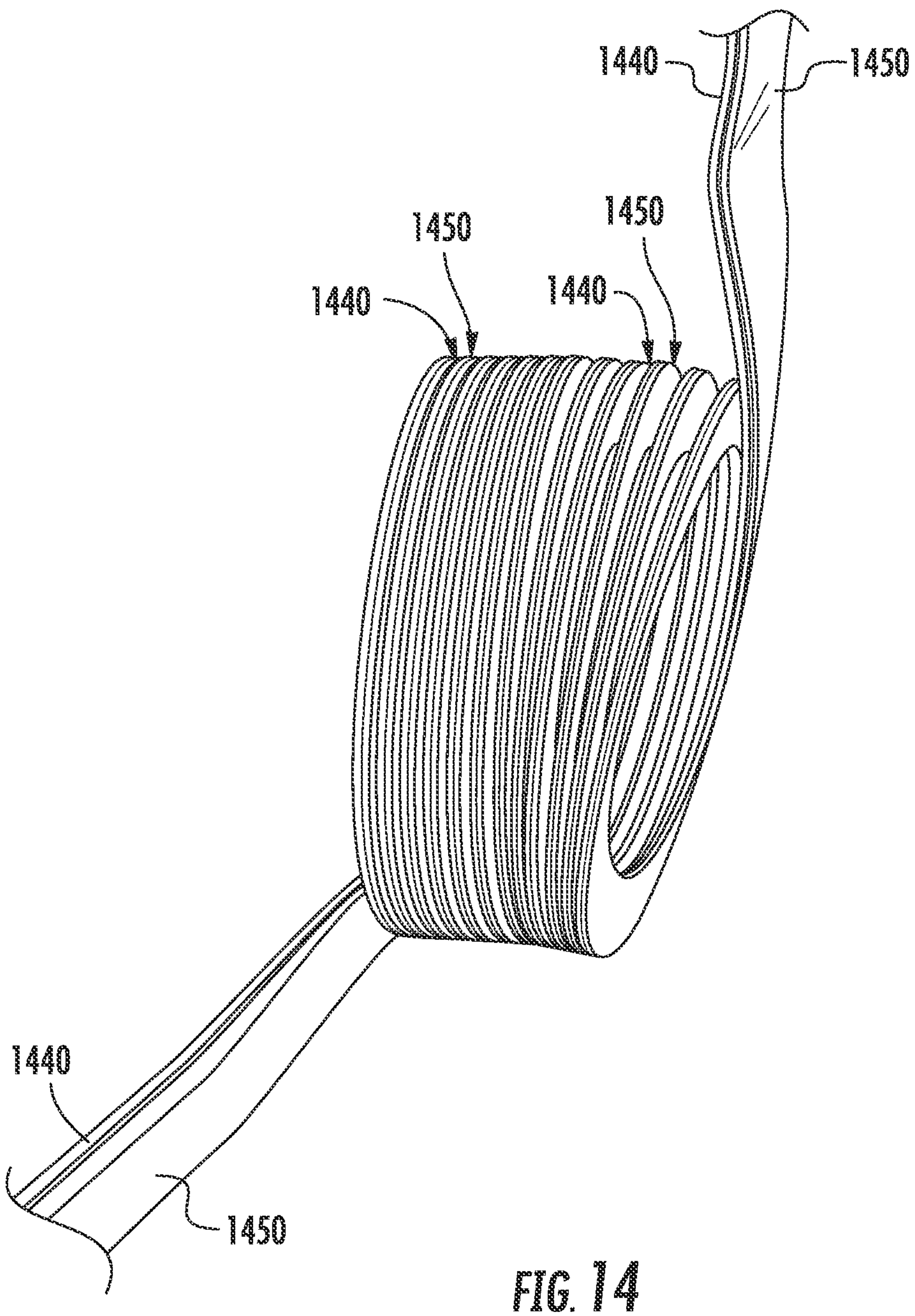
FIG. 14 illustrates a coil for use in a nested winding arrangement of the present invention formed with multiple wires.

The windings of the invention may comprise magnet wire that has been wound on edge and/or has been spiral wound in various shapes to allow for the creation of multi-turn windings. The nesting of windings may allow for higher turn windings as will be discussed below and for multifilar windings when the inside dimension of the coil is tighter than the winding materials ability to stretch and compress without compromising the material or coating integrity. Higher turn counts of the windings may be achieved using this nested configuration and higher turn counts result in higher power transformers that operate as low as the 50 kHz range for standard off-line switch mode transformers. A thicker magnet wire may be wound as a continuous conductor without the need for additional external connection points thereby reducing labor, winding resistance and reducing the physical space needed to make the winding. The tighter proximity of the turns in the windings allows for a better coupling factor within transformer 100. To further reduce leakage, and produce a minimal leakage inductance designs the winding may be formed of multifilar wire (a coil with more than one wire (filar) used to form the coil, such as multiple wires turned around a mandrel), as shown in FIG. 14. This multifilar wire configuration may enhance the high leakage field flux cancelation due to the canceling of adjacent turns. Flat wound coils allow for tighter coil packing, higher copper density per unit area, and thus higher current capability and lower resistive losses.

The windings of the present invention may take various forms, and may be formed with similar or different types of wires. Thus, the windings may be formed from wire of a certain type having similar characteristics (e.g., materials, shape, width, height, cross-sectional profile or shape, performance characteristics). For example, an inner winding and an outer winding of a winding set may be formed from a similar type of wire. Alternately, the windings may be formed from wire of a certain type having different characteristics. For example, an inner winding and an outer winding of a winding set may be formed from different types of wire. Different winding sets could be formed from similar or different wire types. As can be appreciated, various combinations of wire types could be employed within the scope of the invention.

Windings of various turn counts may be interleaved within a single stacked structure to reduce the EMF fields within transformer 100 windings to reduce high frequency proximity effect losses. Thin copper with wider aspect ratios can be created via the inner and outer coil structure of the present invention, as the buckling and deformation of flat wire with a rectangular cross-section can be reduced or eliminated by keeping the wound ID (inner diameter) to wire width ratio at 2.5 or greater.

Further, the use of magnet wire provides functional insulation on every winding without the need for additional insulating materials to be added to meet dielectric withstand voltages of <1000 Vrms.

As shown, a plurality of connection pins 30 may be located on opposite sides of the support frame 90 adjacent outer edges of the windings having terminal ends (terminals) that may be electrically coupled to at least two of the plurality of connection pins 30. The plurality of connection pins 30 may be individually electrically coupled to a source or load, for example, to electrically connect the windings. The pins 30 may be configured to allow customer boards to use standard drills to make solder connections. While any number of connection pins may be included in the plurality of connection pins 30, two rows of six pins each are depicted in FIGS. 1-3 and 5. This total of twelve pins may enable electrical coupling to six windings without any interconnection. The plurality of connection pins 30 may be formed from any electrical conducting material and may comprise copper or copper plated steel pins, for example, and may be formed in a round, rectangular or square shape with a length as needed to match the geometry of use, and diameter determined by use and convenience of attaching coils thereto.

In a preferred embodiment, one or more of the terminals of the windings are turned (i.e., twisted) at approximately 90 degrees to connect to one or more pins.

The lead orientation of any assembled nested winding or coil stack of the invention is not critical and should be considered as a variable. With the coils nested, the windings can then be assembled into a magnetic core that may or may not have a lead-frame and/or other insulating material, and may or may not be combined with windings made in a similar manner, with copper sheet windings or with traditional style magnet wire windings, or any combination of the foregoing winding arrangements.

As shown in FIGS. 2 and 3, a top core 80 is provided to encase the interior portions of the transformer 100 along with the bottom core 10. The top core 80 is essentially a mirror image of the bottom core 10, and includes a top column 89 having a diameter less than the diameter of the central column 20, such that the top column 89 can fit within the opening in the top of central column 20. In addition, curved channels 11 are provided on opposite sides of the top column 89, to accommodate and receive the curved portions of the support frame 90. When assembled, the top core 80 and bottom core 10 will thus form a core body to encase or "sandwich" the parts of the windings and parts of the support frame 90, with the opposite outer walls of the support frames and the pins 30 reside outside of the interior of the core body.

The first inner winding 40 has an inner diameter D measured across the inner circumference 41 of the windings, and an outer diameter D' measured across the outer circumference 42. Those diameters will depend, in part, on the width W of the wire forming the winding. When a central column 20 is provided, the inner diameter is sized to be greater than the outer diameter of the central column 20. The closer the size of the inner diameter is to the size of the outer diameter, the closer the fit of the first inner winding 40 will be around the central column 20.

The first inner winding 40 has a vertical thickness or height 45, as measured top to bottom or vertically in the Figures. The thickness 45 is a function of the thickness of the wire from which the first inner winding 40 is formed and the number of turns or windings of the first inner winding 40. These can be varied and selected based on the purpose and functionality of a device utilizing the windings. A bottom coil or terminal end 46 (terminal) of the wire forming the first inner winding 40 provides a first point of electrical connection to the first inner winding 40, such as a connection to one of the pins 30. At the opposite end of the wire forming the first inner winding 40, a top coil or terminal end 47 (terminal) provides a second point of electrical connection to first inner winding 40, such as a connection to one of the pins 30.

The first outer winding 50 has an opening for receiving the inner winding 40. The first outer winding 50 has an inner diameter D measured across the inner circumference 51 and an outer diameter D' measured across the outer circumference 52. The inner diameter is sized to be greater than the outer diameter of the first inner winding 40. The first outer winding 50 has a vertical thickness or height 55. The thickness 55 is a function of the thickness of the wire from which the first inner winding 40 is formed and the number of turns or windings of the first outer winding 50. The closer the size of the inner diameter D is to the size of the outer diameter D', the closer the fit of the first outer winding 50 will be around the first inner winding 40.

A bottom coil or terminal end 56 (terminal) of the wire forming the first outer winding 50 provides a first point of electrical connection to first outer winding 50, such as a connection to one of the pins 30. At the opposite end of the wire forming the first outer winding 50, a top coil or terminal end 57 (terminal) provides a second point of electrical connection to the first outer winding 50, such as a connection to one of the pins 30.

In an embodiment, the thickness 45 of the first inner winding 40 is generally equal to the thickness 55 of the first outer winding 50. However, it is appreciated that the thicknesses can be different or varied.

The second inner winding 60 and second outer winding 70 are arranged similarly to the first inner winding 40 and the first outer winding 50. Thus, the second inner winding 60 has an inner diameter D measured across the inner circumference 61 and an outer diameter D' measured across the outer circumference 62, with the inner diameter sized to be greater than the size of the outer diameter 22 of the central column 20. The second inner winding 60 has a vertical thickness or height 65. The second inner winding 60 has a bottom coil terminal end 66 and a top coil terminal end 67 to provide for electrical connections, such as to one of the pins 30.

The second outer winding 70 has an opening for receiving the second inner winding 60. The second outer winding 70 has an inner diameter D measured across the inner circumference 71 and an outer diameter D' measured across the outer circumference 72. The inner diameter D is less than the outer diameter D'. The second outer winding 70 has a thickness 75. A bottom coil terminal end 76 and a top coil terminal end 77 provide for electrical connections, such as to one of the pins 30.

The inner diameters of the windings may be substantially equal or may have different measurements. The outer diameters of the windings may be substantially equal or may have different measurements.

The top core portion 80 may include opposite front and back faces 84. The top core portion 80 may include opposite right and left side faces 88. The top core portion 80 may include cutout portions 83 formed as openings in the front and back faces 84 designed to allow access between the interior of the core body and the plurality of connection pins 30 once the core body of the transformer 100 is assembled. The cutout portion 83 may include a height X and a width of Y. The cutout portion 83 is shown centered on the front face 84, although any placement along the front face 84 allowing access to the plurality of connection pins 30 may suffice.

The bottom core portion 10 may include cutout portions 13 (13*a* in the front face, and 14 and 13*b* in the back face) designed to allow access between the interior of the core body and the plurality of connection pins 30 once the transformer 100 is assembled. The cutout portions 13 include a height X and a width of Y.

The support frame 90 may comprise a material and may comprise multiple layers. A top layer 91 is located closest to windings. A middle layer 92 is located substantially sandwiched between the first or top layer 91 and a second, lower or bottom layer 93. A portion of middle layer 92 may extend beyond first and second layers 91, 93. As shown, the middle layer 92 may include a series of alignment pins 94. Alignment pins 94 may be located about the portion of middle layer 92 that extends beyond the first and second layers 91, 93.

One of the novel aspects of the present invention relates to the provision of multiple rows of winding sets to achieve varied electro-magnetic attributes of a device according to the present invention. The stacked winding sets provide advantages over other known techniques. The configuration creates higher turn windings (i.e., a series connection) so that windings are capable of supporting higher voltages. The configuration further provides for the arrangement of such windings in a lower profile package. In addition, the windings may readily and easily be positioned into device cores so that multiple primary and secondary interfaces are created from windings having significantly different turns, and while keeping the leakage inductance low. The winding configuration also allows for a larger number of windings to be arranged in a single unit or package. In prior arrangements, the arrangement, number and size of the windings was limited to windings of the same relative height so as to fit within a package or device. Also, the nesting of the coils allows for insulation to be placed between windings so that higher isolation voltages may be achieved compared to concentric windings such, as shown and discussed in FIG. 16 below.

Figure 4:
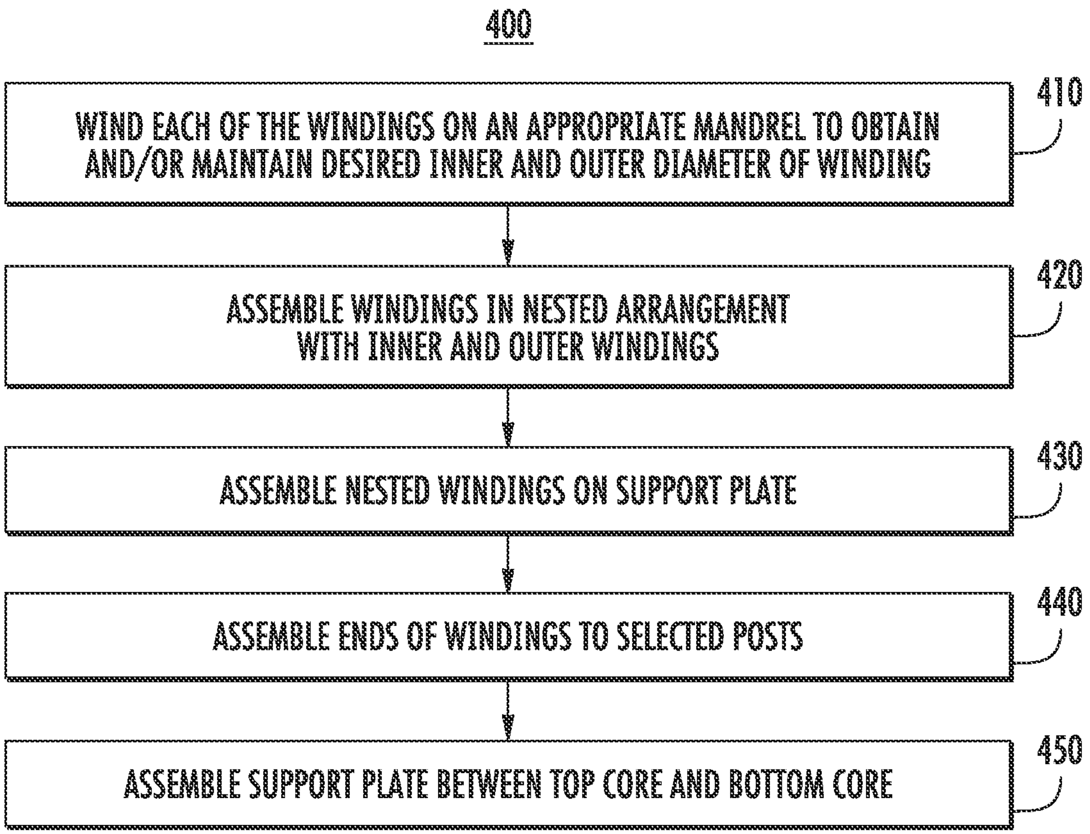
FIG. 4 shows a flow diagram of an embodiment of a method of making a transformer according to the present invention.

FIG. 4 illustrates a method 400 of making a nested transformer according to an aspect of the invention. Method 400 includes winding each of the windings for use in the transformer on the appropriate mandrel to maintain desired inner and outer diameters of each winding at step 410. Multiple windings may be created on different diameter mandrels/arbors. The coil configuration of each winding may be square, rectangular, oblong, or round as needed for a particular application. An outer winding may be wound on a separate mandrel that is a minimum of 0.0005" larger than the maximum outer diameter of the proximate inner winding. The size difference of the outer winding is based on the build height of the inner winding. The outer and inner windings may or may not be the same wire thickness, wire width or number of turns. Each of these aspects of the winding may be varied to achieve spatial and electrical parameters.

At step 420 the windings may be assembled in a nested arrangement by placing an inner winding within an outer winding where the outer diameter of the inner winding complements the inner diameter of the outer winding. The nested windings may be assembled into a magnetic core that may or may not have a lead-frame and/or other insulating material and may be combined with windings made in a similar manner, copper sheet windings, traditional style magnet wire windings and/or any combination of the above mentioned winding styles. Step 420 may be repeated for additional nested windings.

Each assembled set of nested windings may be assembled on a support frame at step 430. At step 440, ends of the windings are connected to pins of the support frame. At step 450, the bottom core and top core portions may be assembled to encase the interior portion of the transformer.

Figure 5:
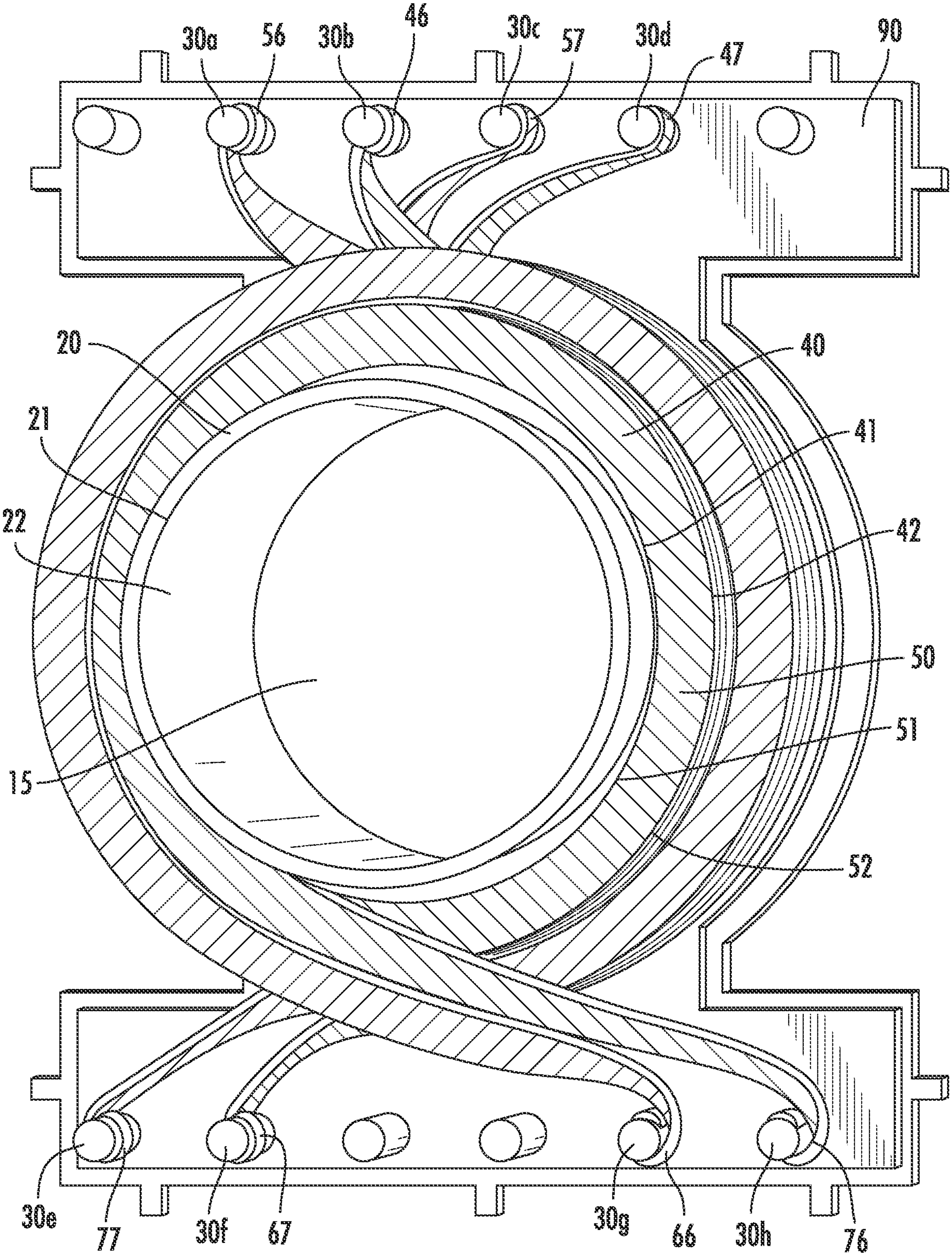
FIG. 5 shows a top view of a transformer according to the present invention, showing the windings having terminal ends twisted 90 degrees and wound around pins of a support frame.

FIG. 5 shows an embodiment of the invention, with multiple stacks of winding sets, and terminals of each winding attached to pins 30. Each terminal is turned approximately 90 degrees from the plane of the windings sets to be wound around an external attachment such as the noted pins 30, which are also oriented at approximately 90 degrees from the plane of the flat surfaces of the windings sets. Thus, if the windings sets are disposed horizontally, the terminal ends can be turned and/or twisted so that they are substantially vertical. It is appreciated that the terminal ends can be turned or twisted for attachment at any angle as compared to the orientation of the windings, such as from a range of about 0 degrees to about 90 degrees. If needed for a particular application, the terminals could be turned greater than 90 degrees. A bent or twisted transition portion of the terminal ends is located between a flat portion of a winding, and the terminal end. Thus, there is great flexibility in how the terminal ends can be positioned, oriented, and attached to external connections.

The terminals may be wound in either a clockwise or counter-clockwise direction, as shown facing the arrangement from above as in FIG. 5. As shown in FIG. 5:

The bottom end terminal 56 of the first outer winding 50 is wound around pin 30*a*. The top end terminal 57 of the first outer winding 50 is wound around pin 30*c*.

The bottom end terminal 46 of the first inner winding 40 is wound around pin 30*b*. The top end terminal 47 of the first inner winding 40 is wound around pin 30*d*.

The bottom end terminal 66 of the second inner winding 60 is wound around pin 30*g*. The top end terminal 67 of the second inner winding 60 is wound around pin 30*f*.

The bottom end terminal 76 of the second outer winding 70 is wound around pin 30*h*. The top end terminal 77 of the second outer winding 70 is wound around pin 30*e*.

Other winding arrangements may be used depending on the number of windings and pins.

Figure 6:
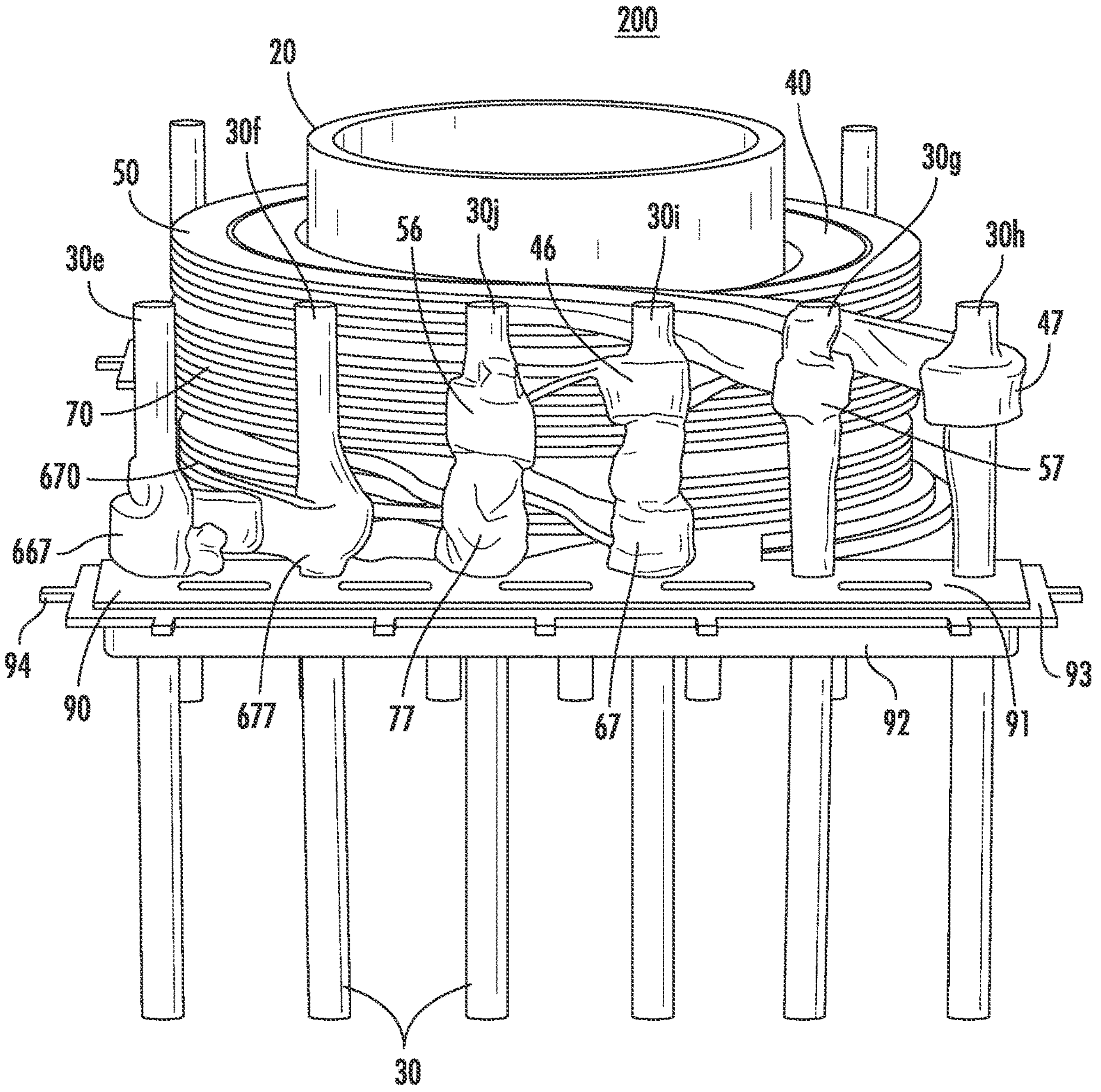
FIG. 6 illustrates a side view of a transformer with three sets of nested windings.
Figure 7:
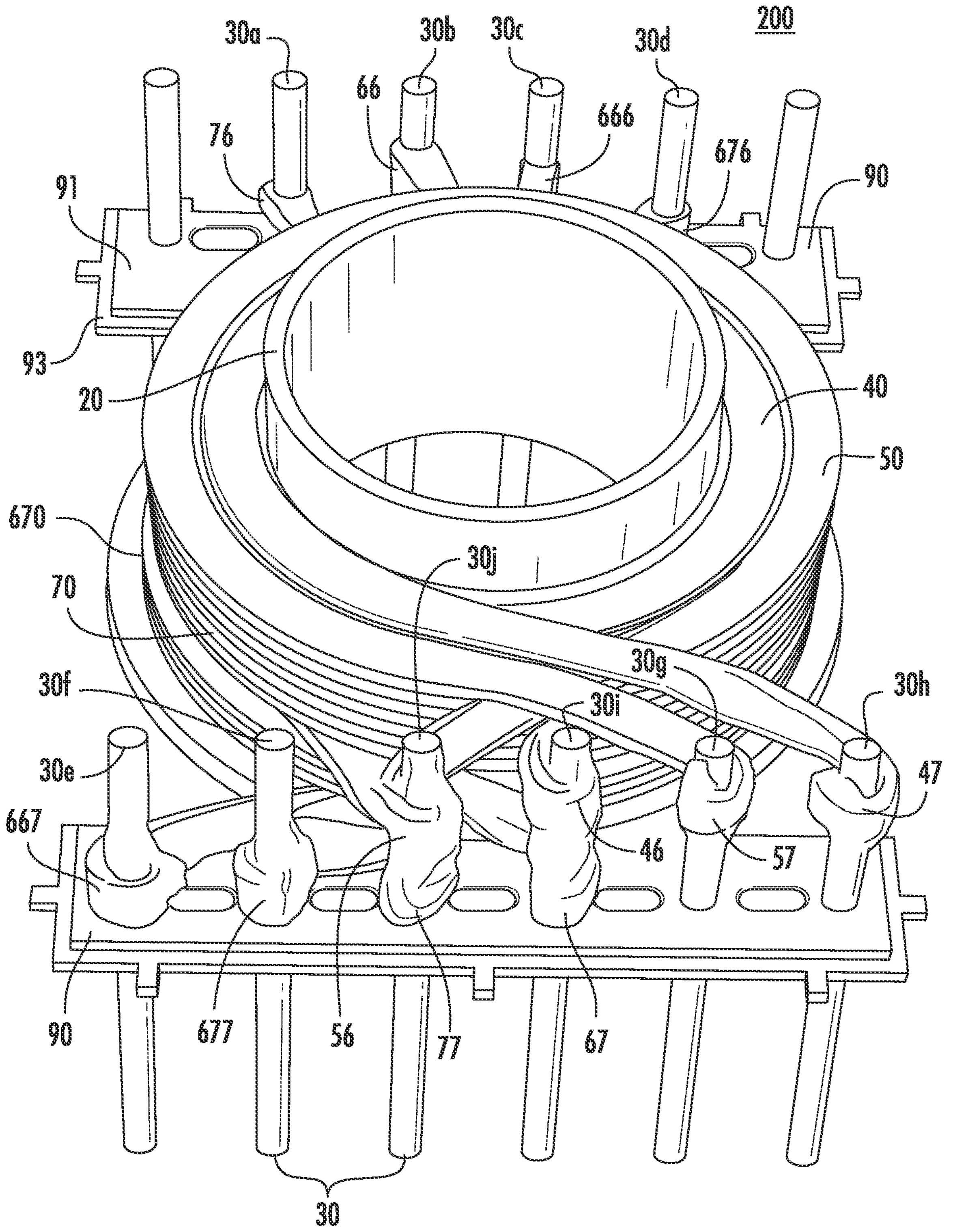
FIG. 7 illustrates perspective top view of the transformer of FIG. 6.

FIGS. 6 and 7 illustrate a transformer 200 with three winding sets, with each winding set comprising inner and outer nested windings. Transformer 200 includes a set of nested windings including first inner winding 40 and first outer winding 50, a second set of nested windings including second inner winding and second outer winding 70, and a third set of nested windings including third inner winding and third outer winding 670 each nested set of windings seated on seating portion 20 and electrically coupled to the plurality of connection pins 30 as described below. In the configuration shown, no insulating layers are positioned between each of the adjacent windings sets, although insulating layers may be included, as described herein. The terminal ends are soldered to provide secure attachment of the terminals to the pins.

First inner winding 40 includes bottom coil terminal end 46 and top coil terminal end 47. Bottom coil terminal end 46 is turned at approximately 90 degrees from the horizontal and electrically coupled to one of the plurality of connection pins 30*i*. Top coil terminal end 47 is turned at approximately 90 degrees from the horizontal and electrically coupled to one of the plurality of connection pins 30*h*.

First outer winding 50 includes bottom coil terminal end 56 and top coil terminal end 57. Bottom coil terminal end 56 is turned at approximately 90 degrees from the horizontal and electrically coupled to one of the plurality of connection pins 30*j*. Top coil terminal end 57 is turned at approximately 90 degrees from the horizontal and electrically coupled to one of the plurality of connection pins 30*g*.

Second inner winding includes bottom coil terminal end 66 (FIG. 7) and top coil terminal end 67. Bottom coil terminal end 66 is turned at approximately 90 degrees from the horizontal and electrically coupled to one of the plurality of connection pins 30*b* (FIG. 7). Top coil terminal end 67 is turned at approximately 90 degrees from the horizontal and electrically coupled to one of the plurality of connection pins 30*i*. This connection electrically couples second inner winding to first inner winding 40.

Second outer winding 70 includes bottom coil terminal end 77 and top coil terminal end 76 (FIG. 7). Bottom coil terminal end 77 is turned at approximately 90 degrees from the horizontal and electrically coupled to one of the plurality of connection pins 30*j*. This connection electrically couples first outer winding 50 to second outer winding 70. Top coil terminal end 76 is turned at approximately 90 degrees from the horizontal and electrically coupled to one of the plurality of connection pins 30*a* (FIG. 7).

Third inner winding includes bottom coil terminal end 677 and top coil terminal end 676 (FIG. 7). Bottom coil terminal end 677 is turned at approximately 90 degrees from the horizontal and electrically coupled to one of the plurality of connection pins 30*f*. Top coil terminal end 676 is turned at approximately 90 degrees from the horizontal and electrically coupled to one of the plurality of connection pins 30*d* (FIG. 7).

Third outer winding 670 includes bottom coil terminal end 667 and top coil terminal end 666 (FIG. 7). Bottom coil terminal end 667 is turned at approximately 90 degrees from the horizontal and electrically coupled to one of the plurality of connection pins 30*e*. Top coil terminal end 666 is turned at approximately 90 degrees from the horizontal and electrically coupled to one of the plurality of connection pins 30*c* (FIG. 7).

Supporting portion 90 may be made from an insulating material such as an injection molded plastic, for example, and may provide electrical insulation to the coils, such as to provide electrical insulation between and from windings 40, 50, 70, 670, and plurality of connection pins 30. Seating portion 90 may include any number of layers of material. In the figures, and with particular to FIG. 6, seating portion 90 is shown as three layers. A first layer 91 is located closest to windings 40, 50, 70, 670. A second layer 93 and a middle layer 92 are located substantially sandwiched between first and second layers 91, 93. A portion of middle layer 92 may extend beyond first and second layers 91, 93.

As shown, middle layer 92 may include a series of alignment pins 94. Alignment pins 94 may located about the portion of middle layer 92 that extends beyond the first and second layers 91, 93. For example, alignment pins 94 may be included in a triad along the portion of middle layer 92 that includes and is aligned with plurality of connection pins 30. One alignment pin 94 may be included at the portion of middle layer 92 at the end of the run of the plurality of connection pins 30.

Figure 8:
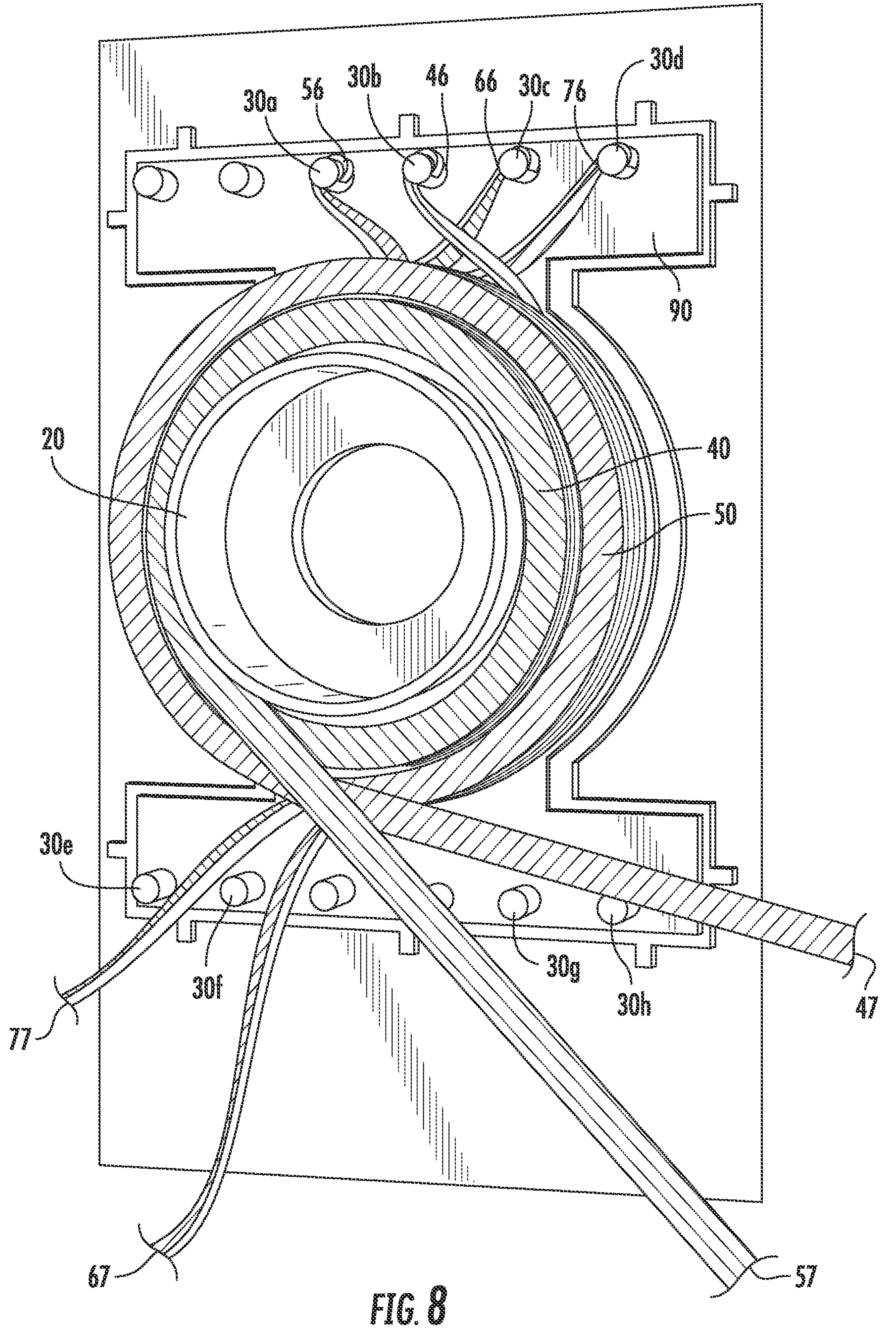
FIG. 8 illustrates a depiction of two sets of nested coils co-aligned with the central column as electrical connections with pins are made.
Figure 9:
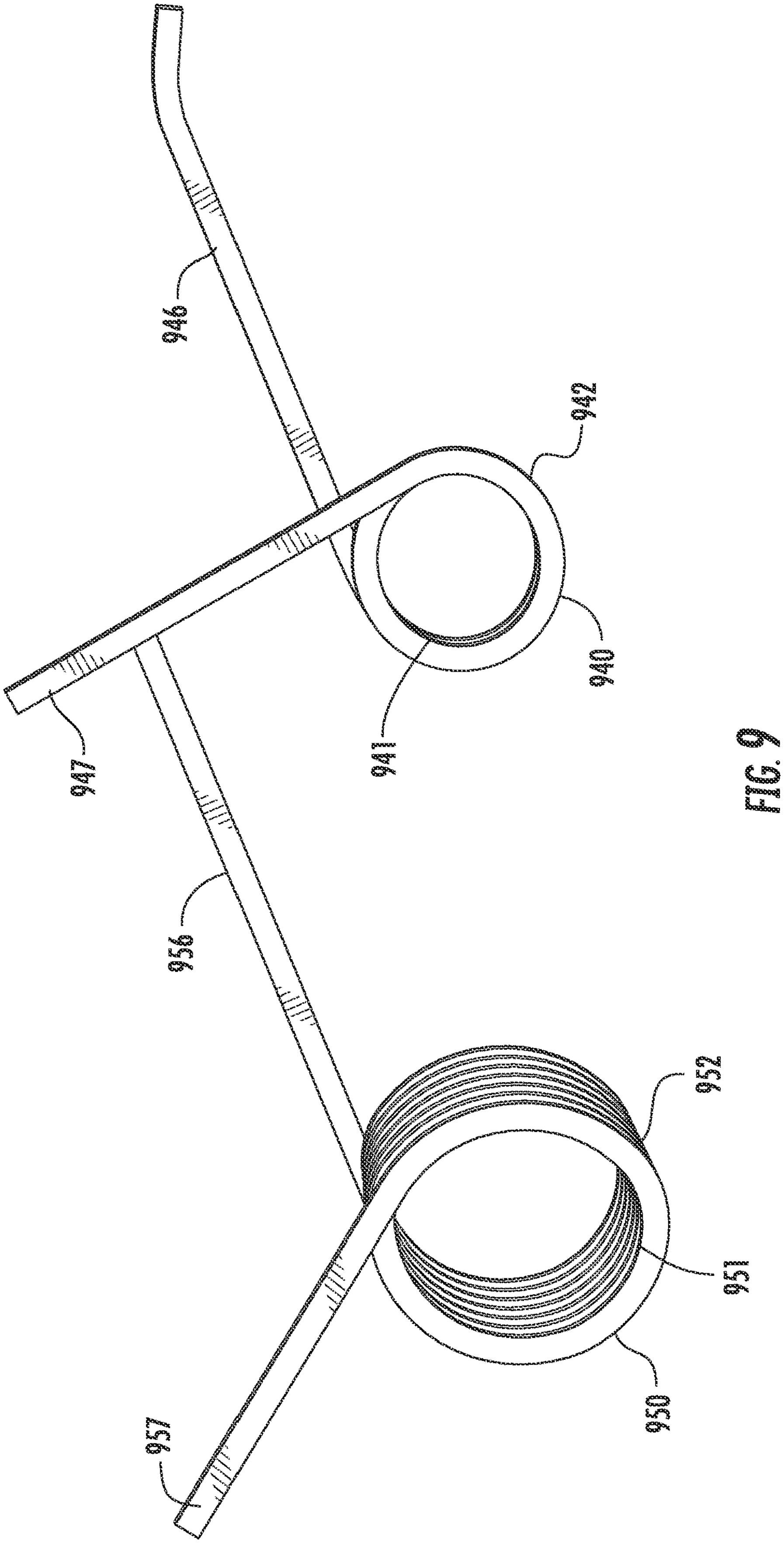
FIGS. 9-13 illustrate depictions of two coils at distinct points during the nesting configuration process.

FIG. 8 illustrates a depiction of two stacked winding sets of nested coils including a first winding set with coils 40, 50 and second winding set below the first winding set, and coaxially aligned about the central column 20 as the electrical connections with the pins 30 are made. The first end of each coil 40, 50, and second set is connected to one of the plurality of pins 30. The terminal end 46 of coil 40 is connected to pin 30*b*. The terminal end 56 of coil 50 is connected to pin 30*a*. The terminal end 66 of coil 60 is connected to pin 30*c*. The terminal end 76 of coil 70 is connected to pin 30*d*.

In FIG. 8, the second terminal end of each coil 40, 50, and second set is not yet connected to one of the plurality of pins 30. The terminal end 47 of coil 40 is being prepared to be turned at approximately 90 degrees and connected to pin 30*h*. The terminal end 57 of coil 50 is being prepared to be turned at approximately 90 degrees and connected to pin 30*g*. The terminal end 67 of coil 60 is being prepared to be turned at approximately 90 degrees and connected to pin 30*f*. The terminal end 77 of coil 70 is being prepared to be turned at approximately 90 degrees and connected to pin 30*e*.

In FIG. 8, terminal ends 47, 57 exit from the nested configuration and have not yet been rotated 90 degrees to prepare for the connection to the respective pin 30. Terminal ends 67, 77 have been rotated 90 degrees from the nested configuration to prepare for the connection to the respective pin 30.

The 90 degree bend in the wire terminal ends provides for an easy, efficient and quick connection of the terminal ends to external connection points such as the pins 30 without needing to provide a precise bend or turn, For example, in prior configurations, it would have been necessary to precisely position the terminal ends for direct connection to, for example, a slot in the end board application as in previous configurations. Further, the described connection allows for multiple windings to be connected to the same pin 30, as shown in FIGS. 6 and 7. This assists in facilitating multiple interleaves of windings to lower the EMF within the coil structure. The present connection provides a quick method of creating center-tapped windings.

It may be noted that the terminal ends of the wires according to the present invention can be configured to extend in multiple different directions. There is no requirement that any two terminal ends extend in the same direction. Thus, in FIG. 8, terminal ends 47, 57, 67, and 77 all point in different directions than terminal ends 46, 56, 66, 76. No two terminal ends shown in FIG. 8 point in the same direction.

In addition, in an embodiment, portions of nested inner and outer coils may extend from an upper or lower surface of a winding set without crossing. This can be seen for example in FIGS. 5 and 7, showing the upper portions and the upper surface of a winding set. Alternately portions of nested inner and outer coils may cross, such as shown in FIG. 8.

FIGS. 9-13 illustrate depictions of two coils at distinct points during the nesting configuration process. While these illustrations depict the nesting of one coil within another, this process may be performed iteratively In FIG. 9, two distinct coils 940, 950 are shown. Coil 940 may become the inner coil and coil 950 may become the outer coil in the nest configuration. Coil 940 includes an inner diameter measured across circumference 941 and an outer diameter measured across circumference 942. Coil 940 includes a first end 946 and a second end 947. Coil 950 includes an inner diameter measured across circumference 951 and an outer diameter measured across circumference 952. Coil 950 includes a first end 956 and a second end 957. Inner diameter 951 and outer diameter 942 may be designed to closely match one another to ensure proper fit of the coils once nested. Closely matching may be defined by a marginal clearance to allow for assembly and the closer the match the better the performance. In certain applications the separation may be larger to add a mechanical coupling such as for voltage switching applications for example.

Figure 10:
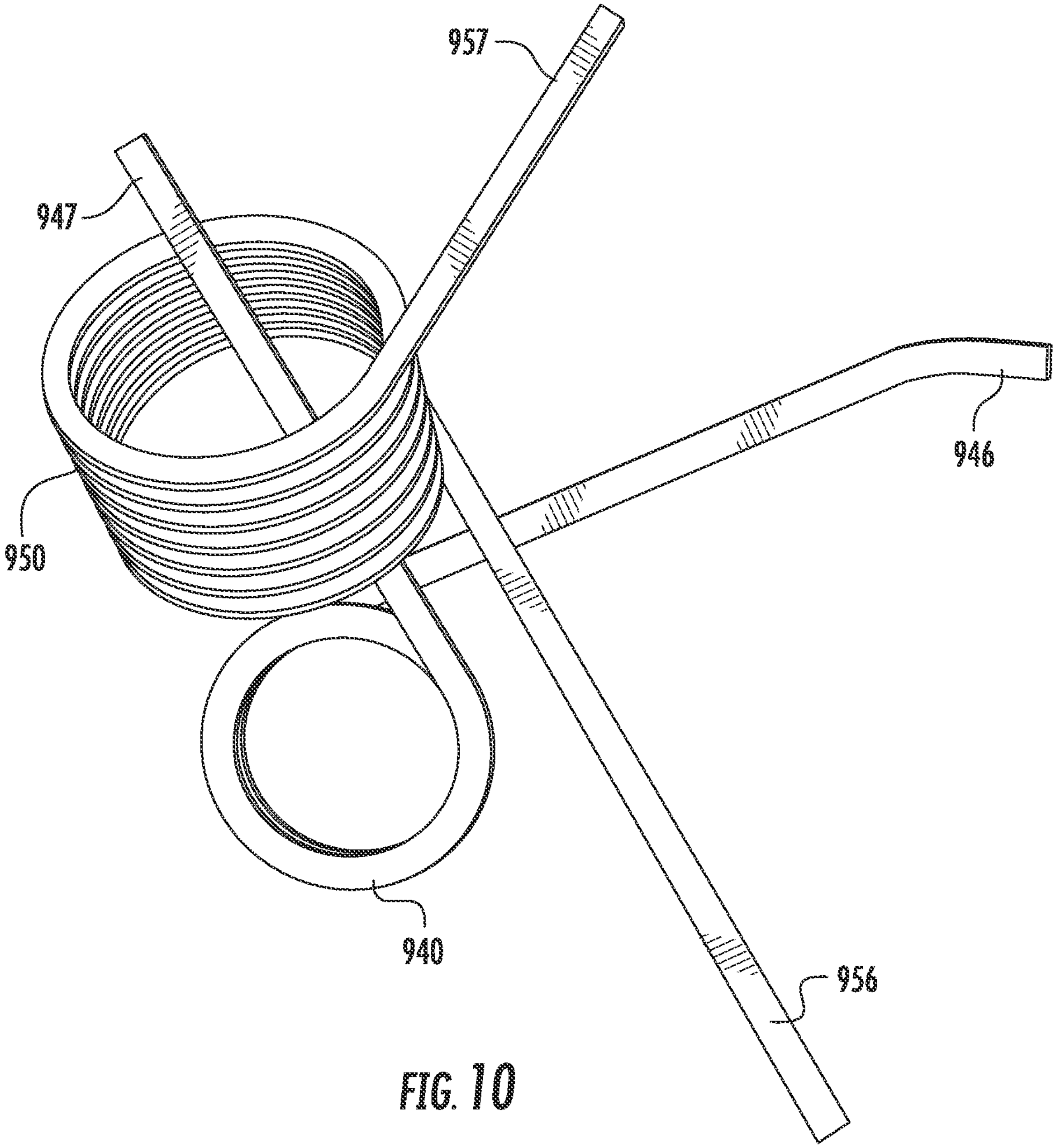

FIG. 10 depicts a first point in the nesting process. Second end 947 of coil 940 is passed through the center opening of coil 950 until it protrudes to the other side of the opening at the center of coil 950. As depicted, there need not be a particular relationship between end 947 and end 957 nor end 946 and end 956 as end 947 is feed through the center of coil 950. The specific orientation may be adjusted after the initial feed through is achieved.

Figure 11:
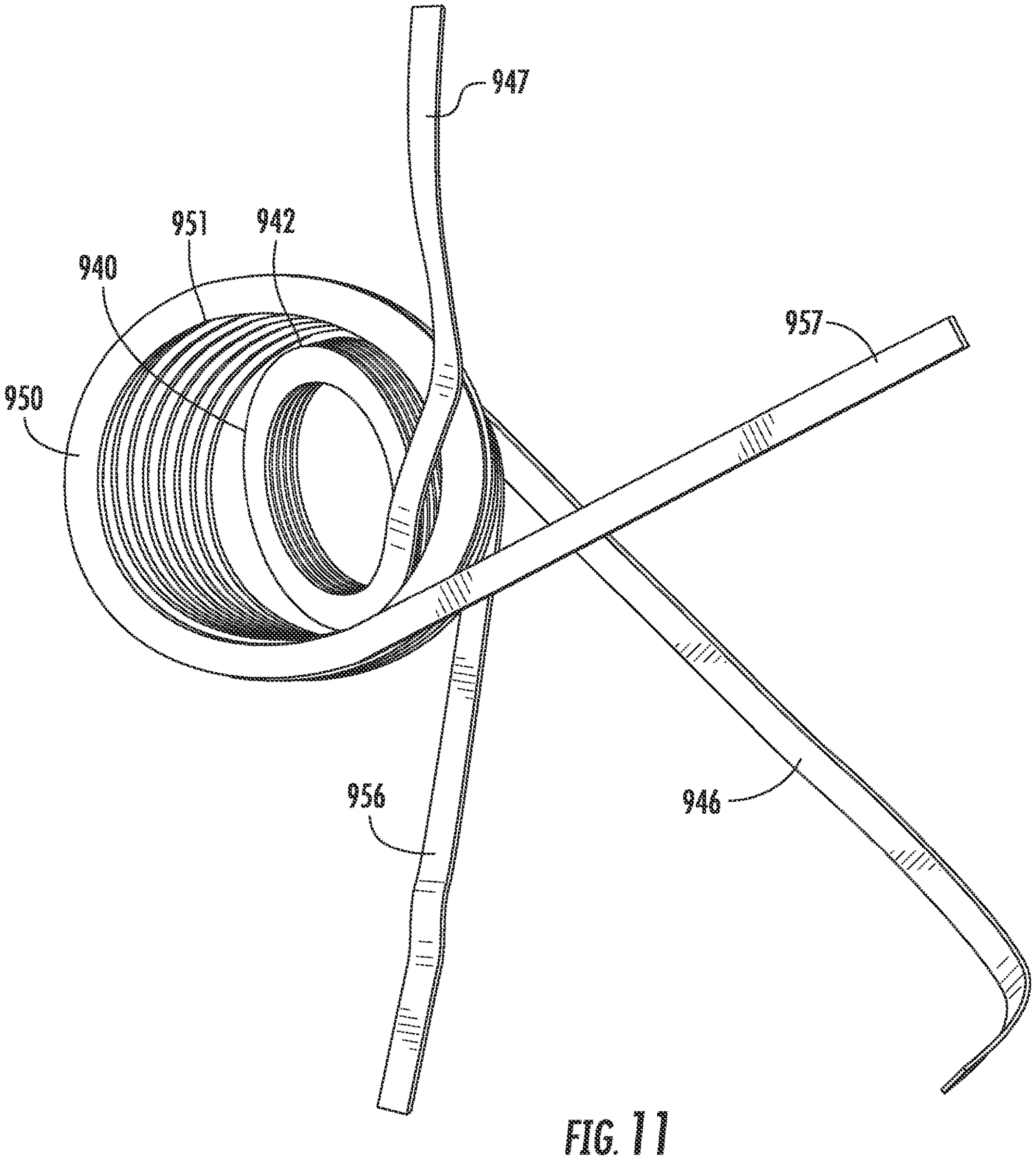

FIG. 11 depicts a second point in the nesting process. Once the second end 947 passes through the center opening of coil 950, coil 940 may be tilted at an angle with respect to the plane of coil 950, such as by 45 degrees, for example. This allows the outer diameter 942 to begin to enter inner diameter 951 and begin to nest. Specifically, a portion of outer diameter 942 may be placed against inner diameter

951 to provide the proper spacing when the tilt is removed in subsequent steps in the nesting process. If the coil has thickness, the bottom edge of the inner coil 940 may be placed in line with the bottom edge of the outer coil 950 along the outer diameter 942 to begin to enter inner diameter 951.

Figure 12:
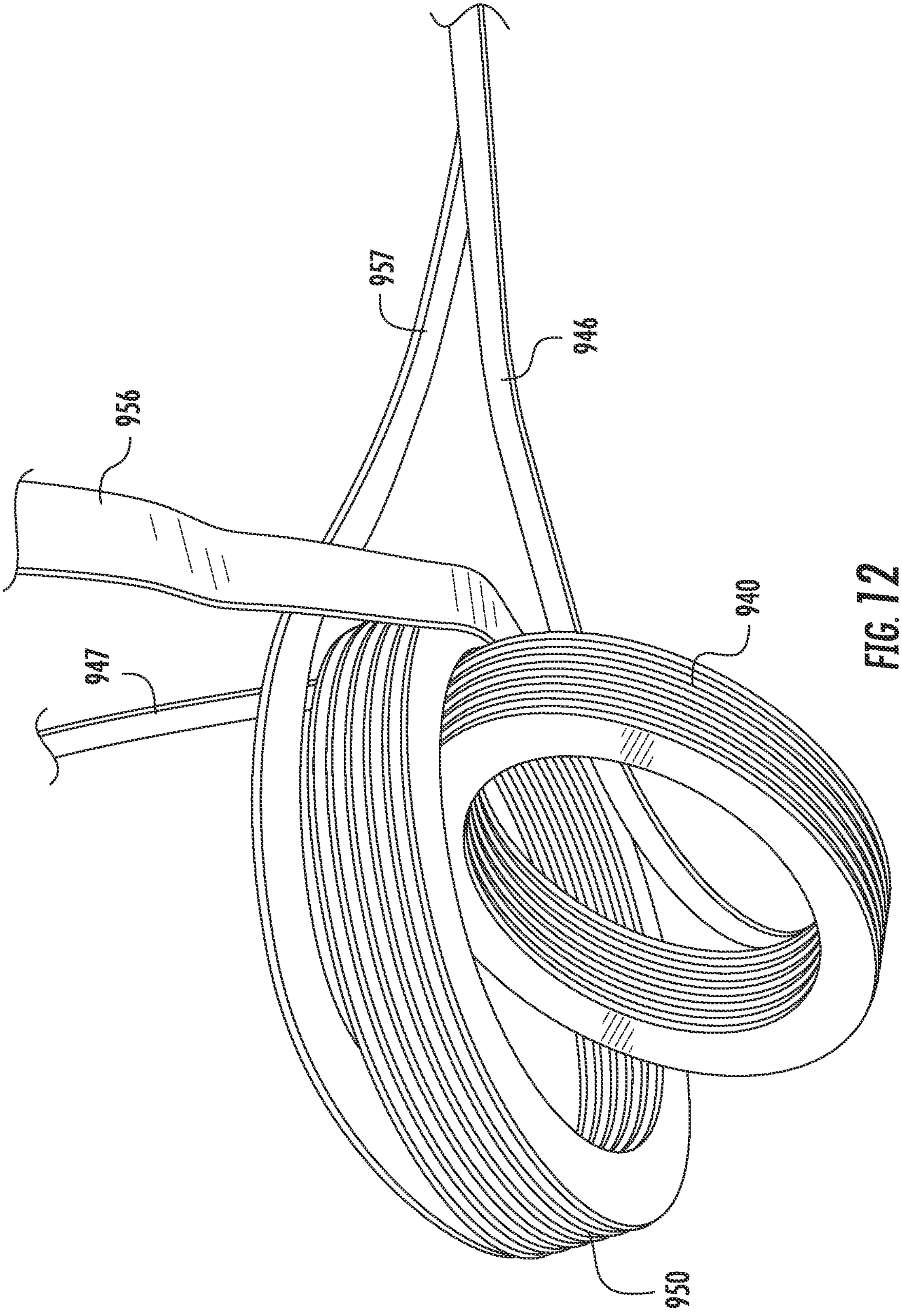

FIG. 12 depicts a point in the nesting process as coil 940 is rotated to nest within coil 950. Once the outer diameter 942 enters inner diameter 951, the coils are aligned to allow coils 940, 950 to become co-linear (flat) and coaxial in a winding set. Removing the angle between the coils, such as the 45 degree tilt imparted between the coils in previous depictions, may include holding the outer diameter 942 that was placed adjacent to inner diameter 951 in place while the remainder of coil 940 is rotated within coil 950.

Figure 13:
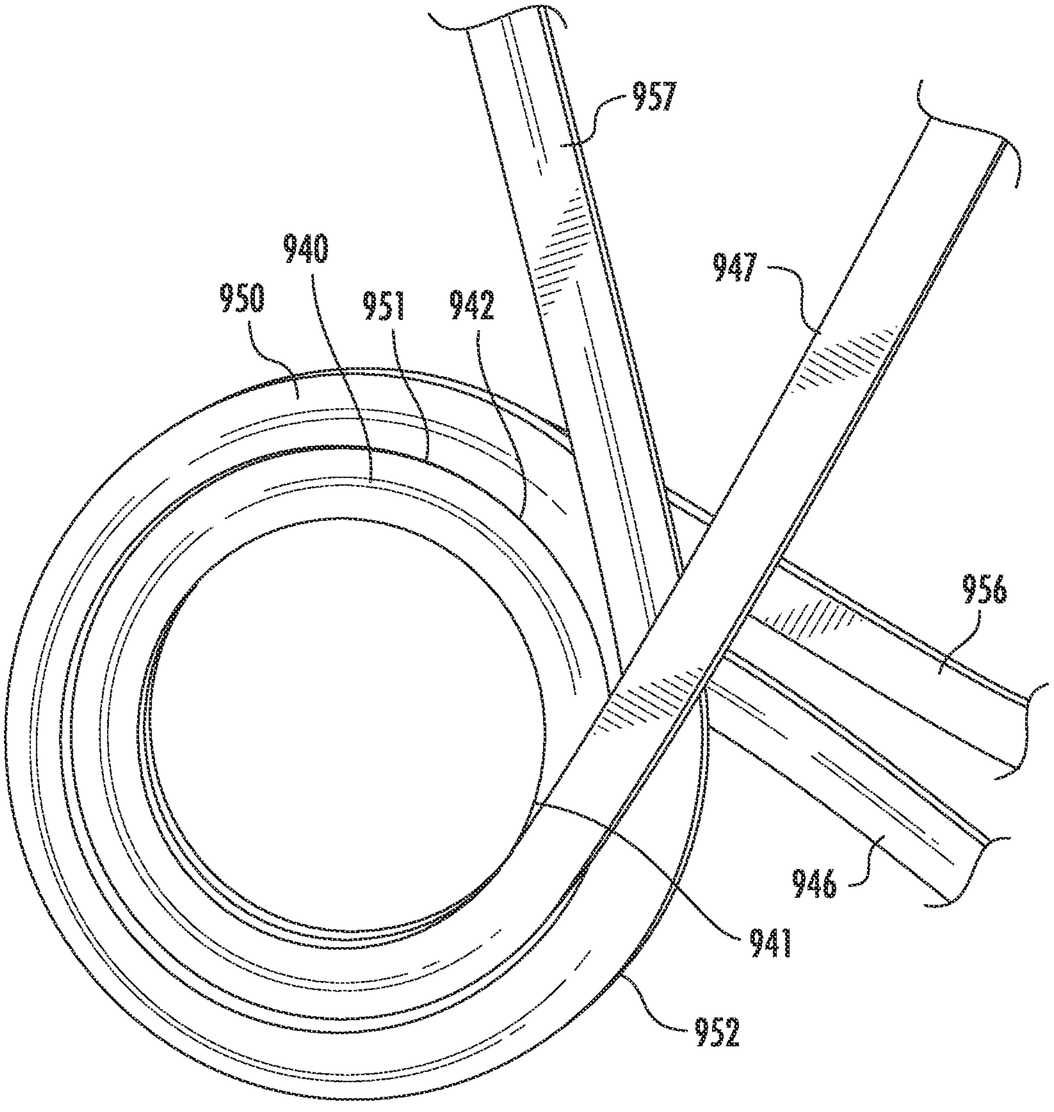

FIG. 13 depicts the two coils 940, 950 nested within each other. Specifically, the nested coils have an overall outer diameter defined by outer diameter 952 and an overall inner diameter defined by inner diameter 941. Inner diameter 951 and outer diameter 942 are adjacent to each other as coils 940, 950 nest together. The proximity of inner diameter 951 and outer diameter 942 is discussed herein, and may be held to a minimum, i.e., only sufficiently large enough to permit the nesting to occur. Essentially, the larger or outside coil 950 is fed over one of the leads of the inside coil 940 and is then cantilevered over the inside coil 940 until the outside coil 950 is concentric with and aligned with the inside coil 940.

The coils 940, 950 may be rotated with respect to each other to align, or misalign the ends 947, 957 on one hand and ends 946, 956 on the other. Terminal ends 946, 947, 956, 957 may be configured to ease in matching pins 30 (shown in other figures) as designed. That is coil 940 may be rotated relative to coil 950 to provide ends 946, 947, 956, 957 alignment with pins 30 for connection.

FIG. 14 illustrates a coil 1400 formed with multiple wires in a multifilar arrangement. As depicted in FIG. 14 a single coil 1400 is formed using multiple wires. As first wire 1440 is helically wound and interleaved with a second wire 1450 to provide a multifilar winding as a bifilar winding since there are two wires. Coil 1400 may be used in any embodiment of the present invention, and may be used as an inner, outer or intermediate winding. In addition, any combination of single and multifilar windings may be used.

Figure 15:
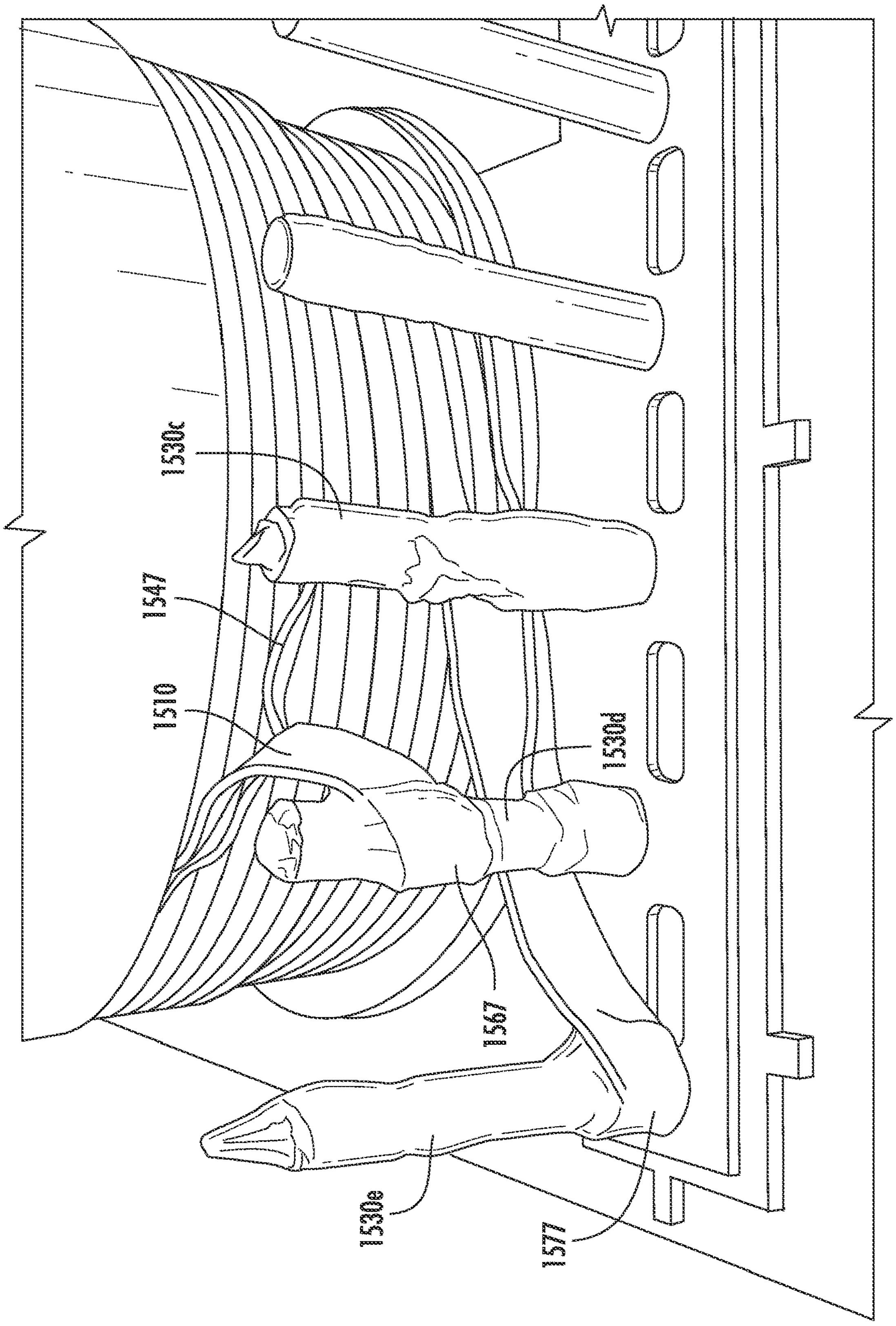
FIG. 15 illustrates the connections of winding terminals to pins.

FIG. 15 illustrates the connections of winding terminal ends to pins with soldering. FIG. 15 depicts three winding ends 1547, 1567, 1577 configured for connection to pins 30. Terminal end 1577 is connected to pin 1530*e*. Terminal end 1567 is connected to pin 1530*d*. Terminal end 1547 is connected to pin 1530*c*.

Terminal end 1567 includes a 90 degree rotation 1510 to provide the connection to pin 1530*d* as described herein.

Figure 16:
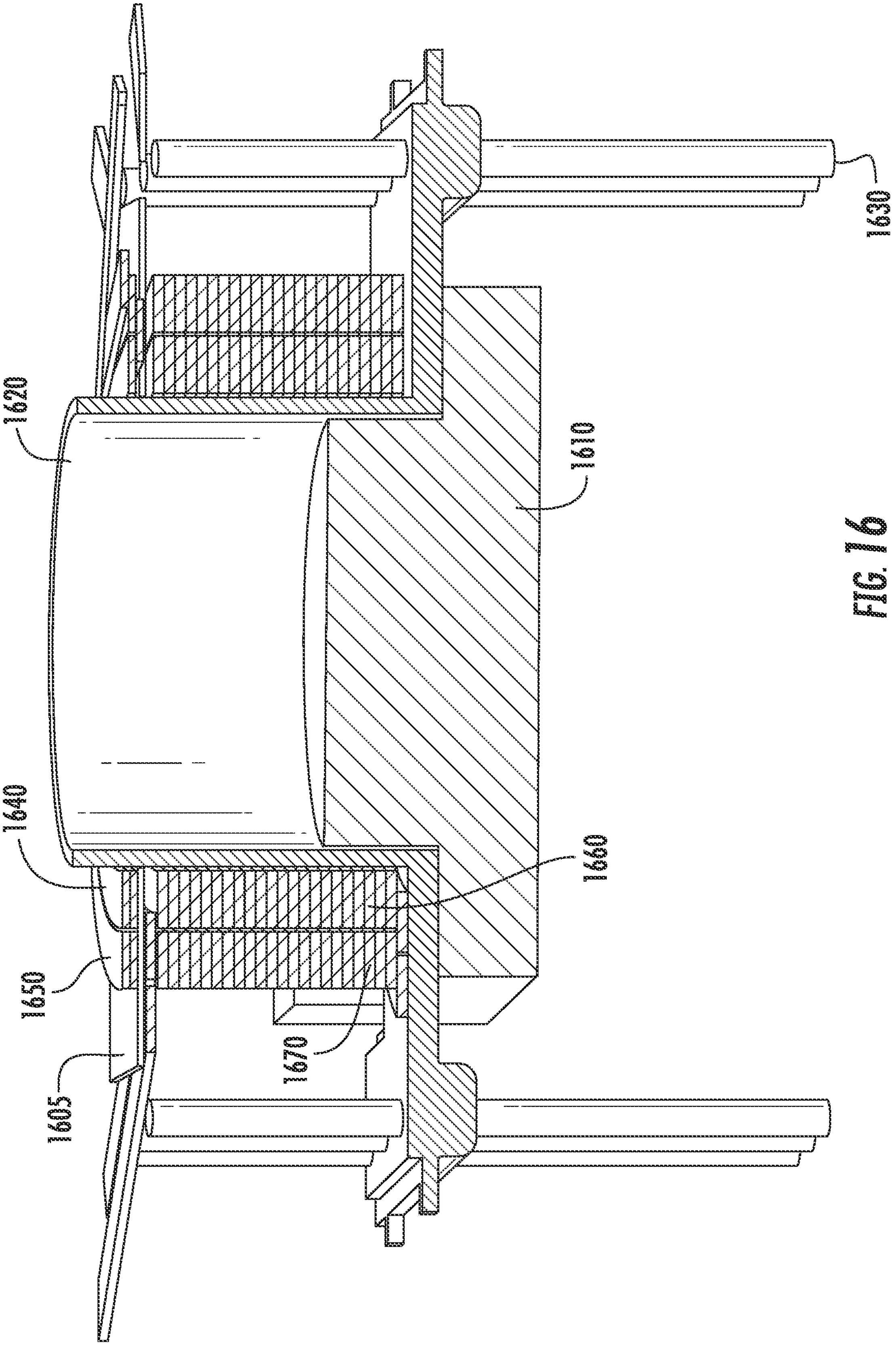
FIG. 16 illustrates cross-sectional view of a winding set of nested coils stacked on another winding set of nested coils using an insulator to separate each winding set.

FIG. 16 illustrates a cross-sectional view of a nested winding set of coils 1640, 1650 stacked on another winding set of nested coils 1660, 1670 using an insulator 1605 to separate the nested sets 1640, 1650 and 1660, 1670. In FIG. 16, coil 1660 may be nested within coil 1670 and coaxially located about central column 1620. An insulator 1605 may be formed as a sheet and placed on top of the winding set of nested coils 1660, 1670 distal to bottom core portion 1610. A second winding set of nested coils 1640, 1650 may be co-aligned on central column 1620 opposite insulator 1605 such that insulator 1605 is sandwiched there between. Insulator 1605 may be formed from an insulating material such as an injection molded plastic, for example. Insulator 1605 may provide electrical isolation between nested set 1640, 1650 and nested set 1660, 1670. Insulator 1605 may also provide thermal isolation between nested set 1640, 1650 and nested set 1660, 1670. It is appreciated that the stacked windings sets may use different amounts of wire, and may have different thicknesses or heights.

The multi-coil design of the invention provides the ability to have multiple interleaves within the winding structure (e.g., primary/secondary/primary/secondary, etc.). Further these designs allow for the bias winding within a transformer to be placed further away from the primary winding so that there is better end output voltage control within a power supply structure. The described winding technique allows for the creation of center-tapped windings, when needed, or allows for the creation of higher turn windings and lower profile packages. The multiple stacked coils allows for more than one secondary winding to be created within the package when needed.

The structure may also allow for the creation of multiple paralleled secondary windings so that thinner wire may be used to help create lower proximity effect losses within the build. Finally, the present structure creates parallel windings (inside and outside coils on the same winding) with narrower copper allowing a tighter bend radius to be used on the edge wound wire. An advantage is that typically edge wound wire needs to be wound no tighter than 2.5×ID (inner diameter) to width to prevent damage to the enamel coating on the winding wire or significant deformation (thinning outside edge and compaction on the inside edge of the coil). The present windings may be wound to better fill the horizontal area within the core structure. Additionally, the use of the narrower copper may allow connection to the tighter pin pitch as described as less space within the product is needed to produce the 90 degree twist in the wire and connection to the pin.

High turn windings may also be created using a "pancake" wound wire coil arrangement (thin magnet wire wound so that the vertical layer build is minimized and the horizontal layer build is maximized) to match the width of any other combination of edge wound rectangular copper magnet wire. This wire may have a round cross-section, for example, or other different geometries in cross-section. This combination of winding techniques allows for the creation of high voltage, low current windings that cannot be easily created with traditional planar style windings.

Figure 17A:
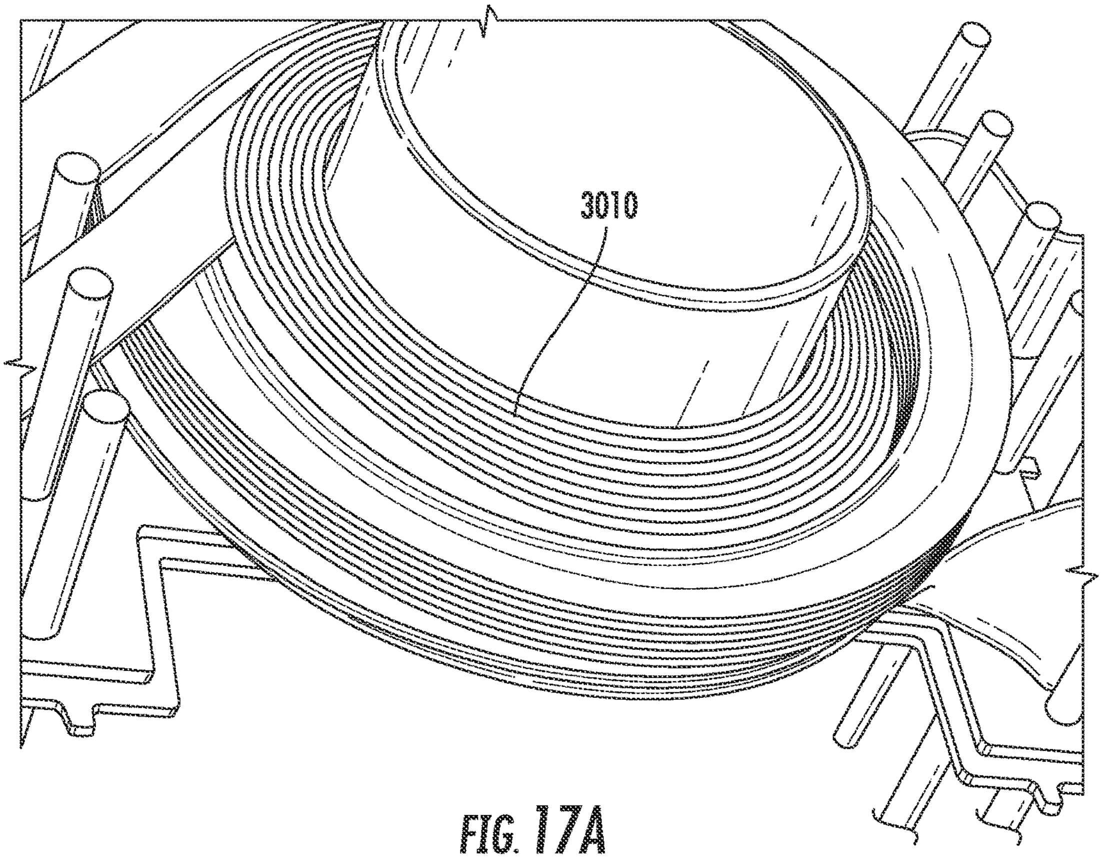
FIGS. 17A and 17B illustrate a transformer incorporating pancake type wire coil arrangement in a winding.
Figure 17B:
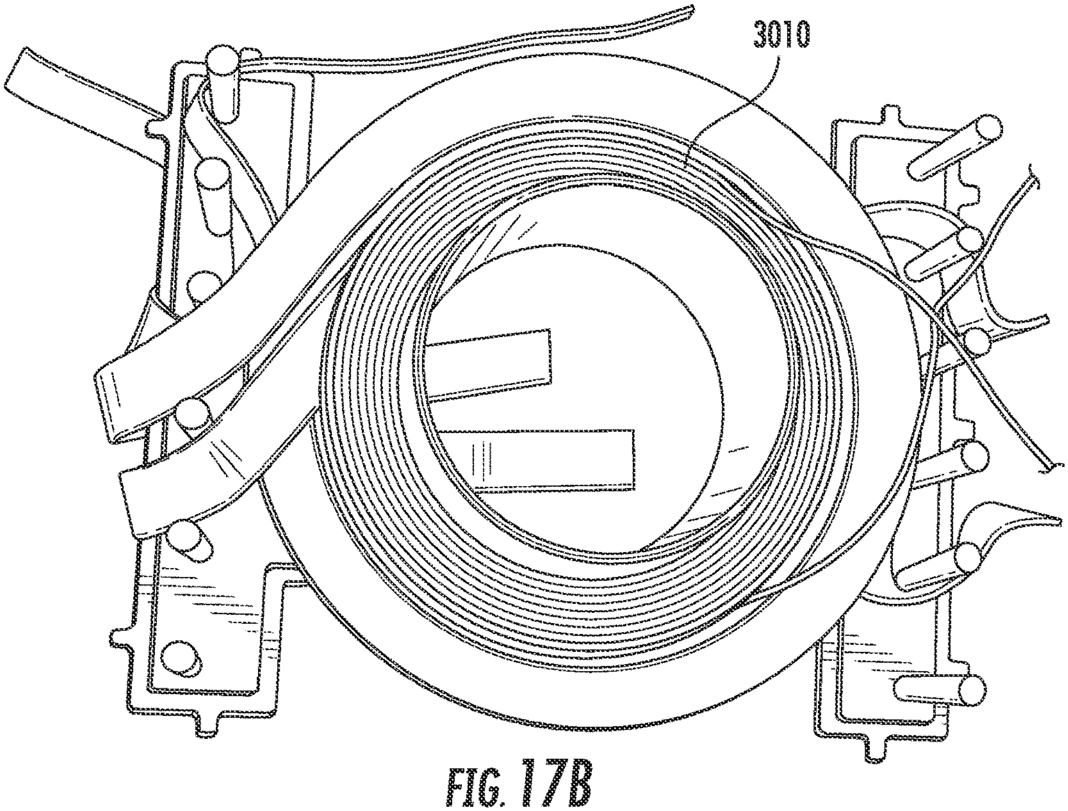

By way of example, a device is illustrated in FIGS. 17A and 17B incorporating a pancake wire coil arrangement 3010 in a winding. As shown in the depicted example, one winding may incorporate the pancake wire coil arrangement 3010 and the other winding may not. The two coils may be formed from wires having different cross-sectional profiles, or alternatively the same or substantially similar cross-sections.

The transformers described herein may be utilized as low profile switch mode transformers operating in the 10-1200 W range and may be a direct replacement for traditional planar style transformer. This transformer may be used in all market applications.

The described nested windings may be utilized with the additional windings either in the form of other edge wound coils or as noted above result in a low profile planar style transformer that can be completely wound with magnet wire and does not require circuit boards to achieve the reduced height.

The present transformer allows for a greater conductor fill factor within the transformer window—the elimination of insulating material and no need for trace to trace spacing allow for more of the magnetic core window to be filled with conductor. This increases the copper fill factor using this style design to approximately 60% window utilization while a traditional planar board approach will be closer to 35% window utilization.

Variable thickness coppers can be put within the same package with little to no cost differential beyond the base metal price of the winding material.

The layers of edge wound windings may build outward in terms of proximity effect. Meaning that multiple turns of wire can be wound and the resulting effect on the high frequency resistance is that of a single layer winding. When an outer winding is added that winding behaves like the second layer in terms of proximity effect and effective AC resistance within transformer 100.

The wire wound nature of the transformer described herein enables the turns and layering of the transformer to be changed and optimized with minimal cost eliminating the need for creating new circuit board windings (planar boards) that are used in traditional planar/low profile transformers. The transformer described herein provides cancellation of leakage inductance fields using this winding technique as the coil stack allows for a complete covering of the turns above and/or below the winding in question.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. An electro-magnetic device comprising:

a first winding comprising a wire, the first winding having an opening defining a first diameter;

a second winding comprising a wire, the second winding having an opening defining a second diameter, the second winding sized to be nested within the opening of the first winding, the first winding and the second winding forming a first winding set having a lowermost surface and an uppermost surface;

a third winding comprising a wire, the third winding having an opening defining a third diameter;

a fourth winding comprising a wire, the fourth winding having an opening defining a fourth diameter, the fourth winding sized to be nested within the opening of the third winding, the third winding and the fourth winding forming a second winding set having a lowermost surface and an uppermost surface, wherein the first winding, the second winding, the third winding and the fourth winding are wound around and completely encircle an axis of the electro-magnetic device; and a support frame comprising a plurality of pins oriented parallel to the axis, wherein an end of each of the first winding, the second winding, the third winding and the fourth winding are connected to a different one of the pins;

wherein the first winding set is positioned above and adjacent to the second winding set, and wherein the lowermost surface of the first winding set is adjacent to and facing the uppermost surface of the second winding set, and wherein at least one of the first winding, the second winding, the third winding, or the fourth winding comprises a flat wire having a rectangular cross-section, and wherein at least one of first winding, the second winding, the third winding, or the fourth winding has an oblong or round cross-section.

2. The device of claim 1, wherein the first winding has a thickness, and wherein the second winding has a second thickness.

3. The device of claim 2, wherein the thickness of the first winding is substantially the same as the thickness of the second winding.

4. The device of claim 2, wherein the thickness of the first winding is different than the thickness of the second winding.

5. The device of claim 1, wherein the first winding set has a thickness, and the second winding set has a thickness.

6. The device of claim 5, wherein the wherein the thickness of the first winding set is substantially the same as the thickness of the second winding set.

7. The device of claim 5, wherein the wherein the thickness of the first winding set is different than the thickness of the second winding set.

8. The device of claim 1, wherein each winding has a first terminal end and an opposite second terminal end.

9. The device of claim 8, wherein at least one of the terminal ends of the winding comprising the flat wire having a rectangular cross-section is twisted and oriented approximately 90 degrees from the winding.

10. The device of claim 1, wherein at least one of the windings comprises a multifilar wire.

11. The device of claim 1, wherein the diameters of the openings of the first winding and the third winding are essentially equal.

12. The device of claim 11, wherein the diameters of the openings of the second winding and the fourth winding are essentially equal.

13. The device of claim 1, wherein the first winding set and the second winding set are coaxially aligned.

14. The device of claim 1, wherein the wire used to form the first winding is of a same type as the wire used to form the second winding.

15. The device of claim 1, wherein the wire used to form the first winding is of a different type than the wire used to form the second winding.

16. The device of claim 1, wherein the wire used to form the third winding is of a same type as the wire used to form the fourth winding.

17. The device of claim 1, wherein the wire used to form the third winding is of a different type than the wire used to form the fourth winding.

18. The device of claim 1, further comprising:

a fifth winding comprising a wire, the fifth winding having an opening defining a fifth diameter;

a sixth winding comprising a wire, the sixth winding having an opening defining a sixth diameter, the sixth winding sized to be nested within the opening of the fifth winding, the fifth winding and sixth winding forming a third winding set having a lowermost surface and an uppermost surface;

wherein the third winding set is positioned above and adjacent to the first winding set, and wherein the lowermost surface of the third winding set is adjacent to and facing the uppermost surface of the first winding set.

19. The device of claim 1, further comprising an outer winding comprising a wire, the outer winding having an opening defining a diameter, the opening of the outer winding configured to surround and receive one of the second winding or the fourth winding in a nested arrangement.

20. The electro-magnetic device of claim 1, wherein at least one of the first winding, the second winding, the third winding, or the fourth winding comprises a flat wire having a width and a thickness, the width being greater than the thickness, and wherein the width extends substantially parallel to the axis around which first winding, the second winding, the third winding, and the fourth winding are wound.

21. The electro-magnetic device of claim 1, wherein at least one of the first winding, the second winding, the third winding, or the fourth winding comprises a pancake wound coil.

22. A method for manufacturing a transformer with nested flat wound coils, the method comprising:

forming a first winding comprising a wire, the first winding having an opening defining a first diameter;

forming a second winding comprising a wire sized to be nested within the opening of the first winding, the second winding having an opening defining a second diameter;

positioning the second winding within the opening of the first winding to form a first winding set having a thickness and a lowermost surface and an uppermost surface;

forming a third winding comprising a wire, the third winding having an opening defining a third diameter;

forming a fourth winding comprising a wire sized to be nested within the opening of the third winding, the fourth winding having an opening defining a fourth diameter;

positioning the fourth winding within the opening of the third winding to form a second winding set having a thickness and a lowermost surface and an uppermost surface;

positioning the first winding set above and adjacent to the second winding set, and positioning the lowermost surface of the first winding is adjacent to and facing the uppermost surface of the second winding set, wherein the first winding, the second winding, the third winding and the fourth winding are wound around and completely encircle an axis of the transformer;

providing a support frame comprising a plurality of pins oriented parallel to the axis; and connecting an end of each of the first winding, the second winding, the third winding and the fourth winding to a different one of the pins;

wherein at least one of the first winding, the second winding, the third winding, or the fourth winding comprises a flat wire having a rectangular cross-section, and wherein at least one of the first winding, the second winding, the third winding, or the fourth winding has an oblong or round cross-section.

23. The method of claim 22, wherein at least one of the first winding, the second winding, the third winding, or the fourth winding comprises a flat wire having a width and a thickness, the width being greater than the thickness, and wherein the width extends substantially parallel to the axis around which first winding, the second winding, the third winding, and the fourth winding are wound.

24. The method of claim 22, wherein at least one of the first winding, the second winding, the third winding, or the fourth winding comprises a pancake wound coil.

* * * * *